US007143186B2

(12) United States Patent
Stewart et al.

(10) Patent No.: US 7,143,186 B2
(45) Date of Patent: *Nov. 28, 2006

(54) PLUGGABLE HUB SYSTEM FOR ENTERPRISE WIDE ELECTRONIC COLLABORATION

(75) Inventors: Rocky Stewart, Danville, CA (US); Pal Takacsi-Nagy, Cupertino, CA (US); Pascal Hoebanx, Santa Clara, CA (US); Sanjay Dalal, Sunnyvale, CA (US); David Wiser, San Jose, CA (US)

(73) Assignee: BEA Systems, Inc., San Jose, CA (US)

( * ) Notice: Subject to any disclaimer, the term of this patent is extended or adjusted under 35 U.S.C. 154(b) by 502 days.

This patent is subject to a terminal disclaimer.

(21) Appl. No.: 09/785,872

(22) Filed: Feb. 16, 2001

(65) Prior Publication Data

US 2001/0039570 A1 Nov. 8, 2001

Related U.S. Application Data

(60) Provisional application No. 60/258,804, filed on Dec. 29, 2000, provisional application No. 60/183,067, filed on Feb. 16, 2000.

(51) Int. Cl.
*G06F 15/16* (2006.01)
*G06Q 40/00* (2006.01)
(52) U.S. Cl. .................... 709/245; 709/200; 705/37
(58) Field of Classification Search ............. 345/765; 709/200, 245; 705/27, 37
See application file for complete search history.

(56) References Cited

U.S. PATENT DOCUMENTS

| | | | |
|---|---|---|---|
| 5,321,841 A | 6/1994 | East et al. .................. 395/725 |
| 5,446,842 A | 8/1995 | Schaeffer et al. ...... 395/200.01 |
| 5,463,555 A | 10/1995 | Ward et al. ................. 364/468 |
| 5,630,069 A | 5/1997 | Flores ......................... 395/207 |
| 5,634,127 A * | 5/1997 | Cloud et al. ................ 719/313 |
| 5,704,017 A | 12/1997 | Heckerman ................... 395/61 |
| 5,748,975 A | 5/1998 | Van De Vanter ........... 395/793 |
| 5,801,958 A | 9/1998 | Dangelo et al. |
| 5,835,769 A | 11/1998 | Jervis et al. ................ 395/701 |
| 5,836,014 A | 11/1998 | Faiman, Jr. ................ 395/707 |
| 5,913,061 A | 6/1999 | Gupta ......................... 395/680 |
| 5,926,798 A | 7/1999 | Carter ......................... 705/26 |

(Continued)

OTHER PUBLICATIONS

Notification of Transmittal of the International Search Report or the Declaration, dated Apr. 26, 2001, for Int'l Appl. No. PCT/US01/05011.

(Continued)

*Primary Examiner*—John Follansbee
*Assistant Examiner*—Ashok Patel
(74) *Attorney, Agent, or Firm*—Fliesler Meyer, LLP

(57) ABSTRACT

An enterprise wide electronic commerce system allows trading partners to act as participants in a complex trading process. Participants communicate with one another by joining conversations that are hosted in a collaboration space and managed by a collaboration hub. In this manner, the enterprise workflow may have an effect on, or be affected by, local workflows. The invention provides a pluggable hub system for enterprise wide electronic collaboration. An embodiment of the invention includes a collaboration hub for use with a collaboration system, comprising a hub transport for receiving messages from participants and sending messages to participants, a hub router for routing messages from a first participant to a second participant, a hub scheduler for scheduling the flow of messages between the hub router and the hub transport, a conversation manager for managing the flow of messages between participants, and a repository for storing conversation management data.

26 Claims, 22 Drawing Sheets

U.S. PATENT DOCUMENTS

| | | | | |
|---|---|---|---|---|
| 5,931,900 | A | 8/1999 | Notani | 709/201 |
| 5,941,945 | A | 8/1999 | Aditham | 709/205 |
| 5,960,404 | A | 9/1999 | Chaar et al. | 705/8 |
| 5,961,593 | A | 10/1999 | Gabber et al. | 709/219 |
| 5,966,535 | A | 10/1999 | Benedikt et al. | |
| 5,983,214 | A | 11/1999 | Lang et al. | 707/1 |
| 5,995,945 | A | 11/1999 | Notani | 705/28 |
| 6,018,716 | A | 1/2000 | Denardo | 705/7 |
| 6,028,997 | A | 2/2000 | Leymann et al. | |
| 6,029,000 | A | 2/2000 | Woolsey et al. | |
| 6,044,217 | A | 3/2000 | Brealey et al. | 395/701 |
| 6,052,684 | A | 4/2000 | Du | 707/8 |
| 6,064,980 | A | 5/2000 | Jacobi | 705/26 |
| 6,067,623 | A | 5/2000 | Blakley et al. | 713/201 |
| 6,073,138 | A | 6/2000 | de l'Etraz et al. | 707/104 |
| 6,119,149 | A * | 9/2000 | Notani | 709/205 |
| 6,122,666 | A | 9/2000 | Beurket | 709/226 |
| 6,157,915 | A | 12/2000 | Bhaskaran et al. | 705/7 |
| 6,212,548 | B1 | 4/2001 | DeSimone et al. | 709/204 |
| 6,226,675 | B1 * | 5/2001 | Meltzer et al. | 709/223 |
| 6,230,287 | B1 | 5/2001 | Pinard et al. | 714/31 |
| 6,338,064 | B1 | 1/2002 | Ault et al. | 707/9 |
| 6,353,923 | B1 | 3/2002 | Bogle et al. | 717/4 |
| 6,401,111 | B1 | 6/2002 | Dan et al. | 709/204 |
| 6,594,693 | B1 | 7/2003 | Borwankar | 709/219 |
| 6,604,198 | B1 | 8/2003 | Beckman et al. | 713/167 |
| 6,625,581 | B1 * | 9/2003 | Perkowski | 705/27 |
| 6,732,237 | B1 | 5/2004 | Jacobs et al. | 711/119 |
| 6,795,967 | B1 | 9/2004 | Evans et al. | 719/310 |
| 6,802,000 | B1 | 10/2004 | Greene et al. | 713/168 |
| 6,804,686 | B1 | 10/2004 | Stone et al. | 707/104.1 |
| 6,983,328 | B1 | 1/2006 | Beged-Dov et al. | |
| 2001/0037367 | A1 | 11/2001 | Iyer | |
| 2002/0016759 | A1 * | 2/2002 | Macready et al. | 705/37 |
| 2002/0078365 | A1 | 6/2002 | Burnett et al. | |
| 2002/0165936 | A1 | 11/2002 | Alston et al. | |
| 2003/0005181 | A1 | 1/2003 | Bau, III et al. | |
| 2003/0018665 | A1 | 1/2003 | Dovin et al. | |
| 2003/0041198 | A1 | 2/2003 | Exton et al. | |
| 2003/0110117 | A1 | 6/2003 | Saidenberg et al. | |
| 2003/0131050 | A1 | 7/2003 | Vincent | |
| 2004/0015548 | A1 | 1/2004 | Lee | |
| 2004/0034687 | A1 | 2/2004 | Friedman | |
| 2004/0078435 | A1 | 4/2004 | Dunbar et al. | |
| 2004/0078455 | A1 | 4/2004 | Eide et al. | |
| 2004/0133660 | A1 | 7/2004 | Junghuber et al. | |
| 2004/0136511 | A1 | 7/2004 | Schwartz et al. | |
| 2004/0145608 | A1 | 7/2004 | Fay et al. | |
| 2004/0158610 | A1 | 8/2004 | Davis et al. | |
| 2004/0225995 | A1 | 11/2004 | Marvin et al. | |

OTHER PUBLICATIONS

Notification of Transmittal of the International Search Report or the Declaration, dated Apr. 26, 2001, for Int'l Appl. No. PCT/US01/05011.

"Introducing Microsoft DotNet"; by ChristopheLauer, Jul. 2, 2002; http://web.archive.org/web/20020702162429/http://www.freevbcode.com/ShowCode.asp?ID=2171; pp. 1-10.

Paul, Laura Gibbons, "RosettaNet: Teaching business to work together" Oct. 1, 1999.

Budzik et al., "Clustering for Opportunistic Communication", Dept. of Computer Science, Northwestern Universtiy, Jul. 16, 2002.

Kunisetty, Workflow Modeling and Simulation Using an Extensible Object-Oriented Knowledge Base Management System, CiteSeer, 1996, pp. 1-60, entire reference.

Blake, Rule-Driven Coordination Agents: A Self-Configurable Agent Architecture for Distributed Control, IEEE, Mar. 2001, pp. 271-277, entire reference.

Van Der Aalst et al, Verification of XRL: An XML-Based Workflow Language, IEEE, Jul. 2001, pp. 427-432, entire reference.

Dahalin, et al. Workflow Interoperability Using Extensible Markup Language (XML), IEEE, Jul. 2002, pp. 513-516, entire reference.

* cited by examiner

PLUGGABLE HUB SYSTEM FOR ENTERPRISE WIDE ELECTRONIC COLLABORATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This application claims priority from U.S. provisional patent applications "OPEN MARKET PLATFORM SYSTEM FOR CONDUCTING WEB BASED BUSINESS", Application No. 60/183,067, filed Feb. 16, 2000, incorporated herein by reference and "OPEN MARKET PLATFORM SYSTEM FOR CONDUCTING WEB BASED BUSINESS", Application No. 60/258,804, filed Dec. 29, 2000, incorporated herein by reference.

CROSS-REFERENCE CASES

The following applications are cross-referenced and incorporated herein by reference:

U.S. application Ser. No. 09/788,150 entitled "OPEN MARKET COLLABORATION SYSTEM FOR ENTERPRISE WIDE ELECTRONIC COMMERCE," by Rocky Stewart, Timo Metsaportti, and Pal Takacsi-Nagy, filed Feb. 16, 2001.

U.S. application Ser. No. 09/785,687 entitled "MESSAGE ROUTING SYSTEM FOR ENTERPRISE WIDE ELECTRONIC COLLABORATION," by Rocky Stewart, Pal Takacsi-Nagy, Timo Metsaportti, and Michael Hyndman, filed Feb. 16, 2001.

U.S. application Ser. No. 09/785,693 entitled "CONVERSATION MANAGEMENT SYSTEM FOR ENTERPRISE WIDE ELECTRONIC COLLABORATION," by Rocky Stewart, Pal Takacsi-Nagy, Timo Metsaportti, Sanjay Dalal and Pascal Hoebanx, filed Feb. 16, 2001.

U.S. application Ser. No. 09/785,862, U.S. Pat. No. 7,051,071, entitled "WORKFLOW INTEGRATION SYSTEM FOR ENTERPRISE WIDE ELECTRONIC COLLABORATION," by Rocky Stewart, Pal Takacsi-Nagy, Timo Metsaportti and Adrian Price, filed Feb. 16, 2001.

FIELD OF THE INVENTION

The present invention relates generally to the transaction of business-to-business commerce using the Web.

BACKGROUND OF THE INVENTION

To prosper in the Internet economy, a company must be able to streamline its business process, eliminate unnecessary cost, and react quickly to competitive pressures. To support this mandate, information technology (IT) organizations must have the ability to rapidly consolidate systems from newly created or incorporated divisions and, in many cases, to exchange mission-critical information with outsourced partners as a virtual enterprise. New Internet applications must be linked with each enterprise's core technologies to deliver accurate information, solid operational performance, and a satisfactory customer purchase experience. And, whether companies do business on the Web or not, customers expect all businesses to run on Internet time—a rapid pace that calls for seamless, high-performance business operations that can be accomplished only when applications are integrated with each other to create the zero latency enterprise.

The first business issue is the integration of critical business information and logic that reside in enterprise production and legacy systems. Multiple IT systems that are implemented as silos or standalone systems, each addressing particular business issues, should be integrated across the enterprise.

Traditionally, islands of individual applications that need to share data have been integrated in an ad hoc manner, using homegrown integration and, more recently, Enterprise Application Integration (EAI) toolsets. These hard-coded and point-to-point solutions attempted to address the problem but created an IT nightmare of innumerable spaghetti-like connections between applications. EAI solutions that cobble together a combination of point-to-point interfaces, procedure calls, file transfers, and "e-mail-like" messaging to deliver enterprise-wide data transformation and routing are notoriously high risk.

Further, multiple point-to-point and ad hoc solutions are inherently difficult to deploy and maintain because they lack a centralized management and support for real-time change management. These features are desirable to the management of business processes and the goal of addressing the e-commerce integration environment.

The second business issue is the need to incorporate Web-based, e-commerce applications. The goal of getting on the Web, however, was not a simple one; only new businesses starting from scratch had the luxury of building from the ground up. With substantial IT infrastructures and investments in place, most businesses were faced with having to leverage current information systems and merge them into the e-commerce age. Businesses that are not able to integrate customer-facing Web applications with enterprise systems find that they simply cannot support today's competitive market and customer demands. This is because data is locked away in disparate systems that do not speak the same language, much less speak to each other.

The third business issue is taking full advantage of integrated e-commerce, including the integration of business processes with trading partners. E-Commerce enables companies to enjoy significant savings and increase revenue opportunities by (1) improving service to customers, (2) engaging in just-in-time production, (3) finding more competitive providers of operational goods and production materials, and (4) being able to create new markets quickly. These two objectives—reducing cost and increasing revenue—have always been driving business forces. However, to date, there has been no solution that has provided the key enablers for e-business. Electronic data interchange (EDI) emerged in the 1990s as a standard for exchanging data between companies. EDI is a highly structured, expensive, and time-consuming technology. Packaged solutions have also emerged that claim to solve business-to-business (B2B) dilemmas; however they also require heavy investment in proprietary application technology across all business partners, entail significant configuration expertise, and deliver a hard-coded, pre-packaged process that all parties must adopt. Packaged solutions and EDI deliver very little competitive advantage, are not customizable for differing business processes, and are expensive, time-consuming options.

Most people are familiar with the traditional EDI batch mode type of B2B, and with the more recent electronic store fronts of dot-coms, otherwise referred to as basic commerce. While both EDI and basic commerce provide companies with business advantages that were not previously available—the high costs and technical constraints of implementing EDI and the minimal transaction functionality of basic commerce have limited their adoption as long-term e-business strategies. Community commerce, the third type of B2B e-commerce, features the same characteristics of basic commerce—the simple matching of buyers and sellers online—with perhaps some added functionality, such as auction and search, and the sharing of common information with vertical or community groups. However, these three types of commerce share one common limitation—they do not involve real-time, dynamic conversations between businesses. The sharing of information is in the form of simple point-to-point messages that are not really conversations. While these types of commerce may be sufficient to do things like sharing simple inventory information with suppliers, or posting product catalogs for buyers, these types of commerce have, to date, done little more than simply take information and automate its distribution to participants.

Existing B2B models fall short in meeting modern day requirements. From EDI and outsourced procurement to supply chain management systems and first-generation online exchanges, companies are feverishly searching out technology that will enable them to quickly, efficiently, and reliably conduct business with trading partners over the Internet. Unfortunately, companies are discovering that most of these traditional B2B technologies meet only a fraction of their e-business IT requirements. A more comprehensive, powerful and flexible solution is required to successfully meet the challenges of collaborative B2B commerce today.

While EDI offers an advantage over paper-based business transactions, it has traditionally been restricted to large companies with substantial IT budgets and technical resources. EDI typically requires as much as 9–12 months to implement and can be quite costly. Finally, EDI is not real-time or process-driven. Data is batch transmitted, and transactions can be sent out of sequence without system oversight. In some cases, data may not be received at all—creating consternation and confusion on all sides.

Unlike EDI, new B2B solutions are designed to leverage the Internet and technologies such as Java, in order to lower the barriers to entry for trading partners of any size, reduce deployment cycles and cost, and power managed, real-time communication between partners. Recognizing that EDI will continue to be used by many of the world's largest companies because of familiarity and confidence in legacy systems, new Internet-based e-business platforms must also co-exist comfortably with EDI legacy systems. Nonetheless, as the real and opportunity costs of using EDI grow, companies are investing IT resources in Internet-based systems that make more financial and strategic sense.

Another commonly found form of B2B interaction is the use of outsourced e-procurement applications. Web-based purchasing of maintenance, repair, and operation (MRO) supplies—the goods required to run a company but not the materials used in the direct manufacture of a product or the provision of a service—is becoming more and more common every day. To deliver process efficiencies and cost savings, many companies have outsourced their MRO provisioning to third parties because these goods are non-strategic, low-cost items that can be intermittently purchased in bulk from a pre-established set of suppliers.

However, from a technology perspective, outsourced e-procurement is much like EDI in that it increases efficiency over paper-based processes but is also monolithic, inflexible, and requires all participants to adopt a single proprietary application. This does not enable customers to create competitive advantage by streamlining their mainstream purchasing process or doing business any differently than direct competitors. These serious limitations, combined with the fact that MRO vendors typically own all the data associated with using their exchange, mean that most companies are reluctant to consider e-procurement vendors for their core or strategic enterprise functions. In fact, some participants in MRO exchanges may consider e-procurement vendors as potential downstream competition and are careful to limit the scope of business conducted on these sites.

Given these factors, while many companies may continue using MRO procurement for a portion of their e-business portfolio, they must still acquire strategic technology that will encompass MRO exchanges but support larger and more strategic e-business objectives.

Some organizations have implemented B2B solutions as a first-generation online exchanges for e-markets and supply chain management. An e-market maker can be defined as an organization that develops a B2B, Internet-based, e-marketplace of buyers and sellers within a particular industry, geographic region or affinity group. The list of e-market makers is growing larger every day.

Although it is indisputable that e-marketplaces in general will power much of e-business tomorrow, supporting a broad variety of collaboration, purchasing sales and trading activities, the majority of them are not delivering on the B2B promise today. A recent research study found that of 600 surveyed exchanges, only 10 provided application integration. A primary goal of B2B and online marketplaces is to reduce human intervention. This goal cannot be achieved unless systems are integrated from end-to-end.

E-Markets without back-end integration to a company's enterprise systems significantly reduces the return on investment for e-market makers and participants, and limits that company's opportunities to satisfy customers in new and unique ways. Supply chain transparency, which occurs when e-market makers have increased visibility into a supplier's product availability and delivery information, enables B2C companies to better meet customer demands in real-time and represents a significant source of competitive advantage. The differentiating factor between two supply chains often boils down to which one is better at managing the information float—the time between when data is captured in one place and when it becomes available and actionable elsewhere.

As e-markets continue to proliferate—interconnecting with each other and growing into tomorrow's interconnected e-business "power grid"—they promise to super-charge the B2B network effect. E-businesses need to respond quickly to market demand, and as such look to build not just their own supply chains but also those of their customers and suppliers. These benefits will flow through entire industry segments as information improves, order processing becomes easier, and all parties can begin to rely on getting what they need to meet customer demands in a timely fashion.

SUMMARY OF THE INVENTION

The need to move both operational and customer information at high speed from one end of a distributed enterprise to the other, as well as beyond its firewalls, creates an e-commerce environment that can be adequately addressed only with an end-to-end integration architecture.

E-Business is about competition, and competition is about service speed and quality. Company size and scope are no longer the determining factors for marketplace success, because even very small companies can generate a significant Internet presence. Capturing new business opportunities using the Internet requires business strategies to be developed and implemented in Internet time, and the triumph of speed over size is becoming more apparent every day. While the key drivers for B2B are speed and competition, collaboration between trading partners is the key to winning the game. Truly changing the rules requires real-time information exchange, transactional integrity, flexibility to adapt to changing market conditions, and integrated trading relationships between business partners. The stakes are high, and can make or break a company. The rules change daily, as every e-business executive can attest. These are the real e-business challenges. Meeting these challenges requires a different kind of B2B technology that can meet the real demands of collaborative commerce.

As disclosed herein the invention helps to define an open, standards-based, and scalable software platform for dynamic business-to-business collaboration. The software platform may be embodied in various forms of server product, referred to herein as a collaboration server, or may be incorporated into larger scale enterprise collaboration server products referred to herein as collaboration systems. The several benefits provided by the invention include a comprehensive conversation management capability, an Internet based standard, and a pluggable business logic and protocol support.

A primary component of the collaboration system is the collaboration space (c-space). The c-space is an abstraction supporting a single business model, business message protocols, a secure message space, security policies, quality of service policies, and a registered set of business trading partners. The c-space contains message vocabularies, business process models, participant roles, and other e-market metadata that are essential to the creation, deployment, and ongoing maintenance of trading activities.

Using the invention, a c-space owner can create any number of concurrent c-spaces, each supporting any number of trading partners. Within a c-space, the invention provides asynchronous XML messaging capabilities to allow loosely coupled communication between trading partners.

The collaboration system further comprises a collaboration hub (c-hub). The c-hub is the execution engine of a c-space, allowing the c-space owner and trading partners to create, route, and manage messages within the trading environment. The c-hub delivers powerful messaging services that are essential to ensuring the security, quality, relevance, and success of conversations across the c-space.

Within the context of B2B e-commerce, well-defined and ordered sets of related messages are exchanged between trading partners. This collective set of messages or "conversation" involving two or more trading partners can often span days, weeks, or even months. As conversations and business processes are initiated, executed and completed, conversation management software tracks and manages these long-living conversations, ensures that they are completed, and orchestrates the overall process execution.

Each conversation has a unique context that enables users to manage multiple, concurrent conversations taking place in the c-space. The collaboration system uses such context information to help ensure that messages from one conversation do not get tangled up with messages from another. For example, an individual trading partner may be requesting proposals or negotiating prices with multiple vendors concurrently, and must maintain the integrity and security of each interaction.

In one embodiment, the invention comprises a collaboration hub for use with a collaboration system, comprising a hub transport for receiving messages from participants and sending messages to participants, a hub router for routing messages from a first participant to a second participant, a hub scheduler for scheduling the flow of messages between the hub router and the hub transport, a conversation manager for managing the flow of messages between participants, and a repository for storing conversation management data.

DETAILED DESCRIPTION OF THE PREFERRED EMBODIMENT

Figure 1:
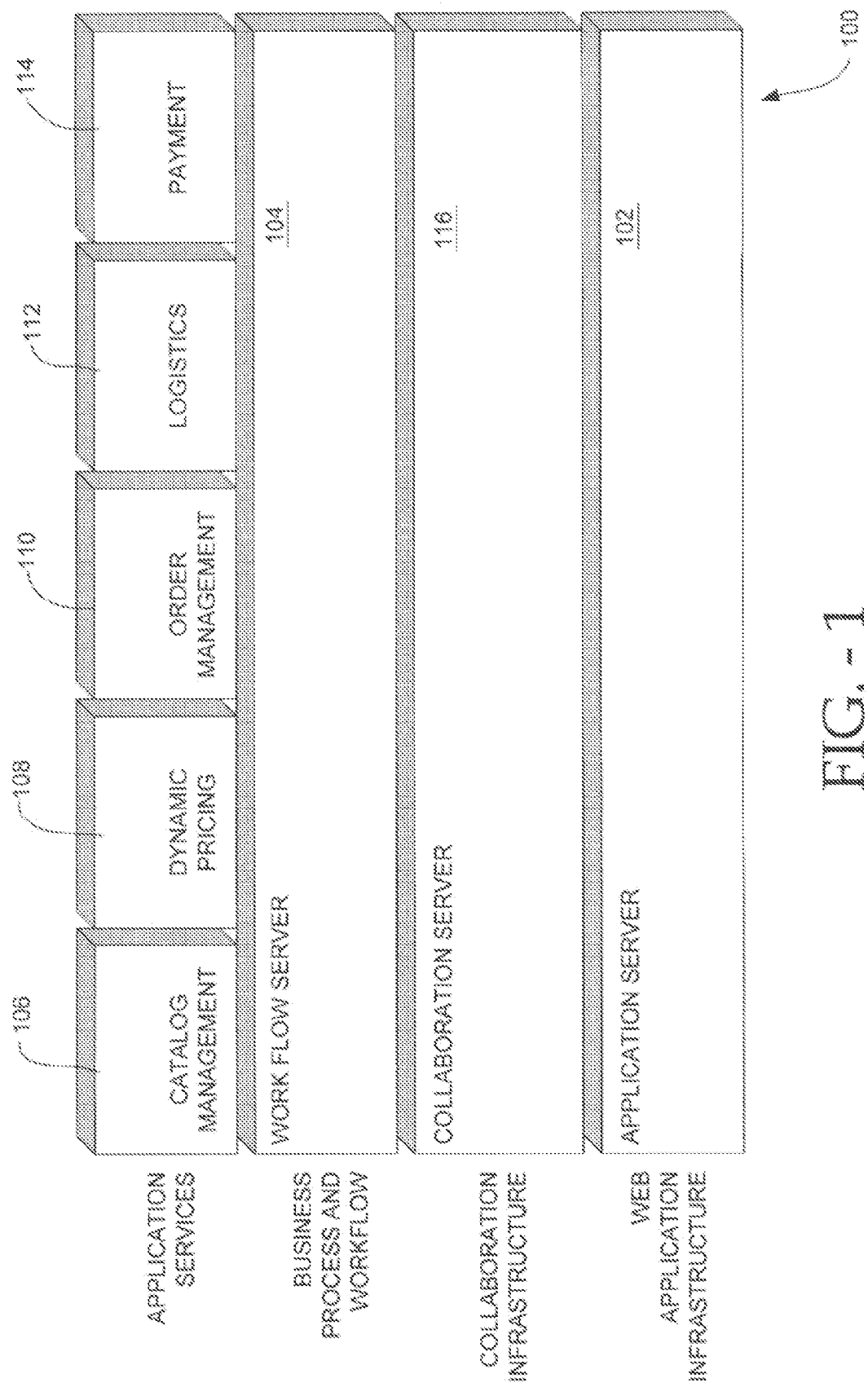
FIG. 1 is an illustration of a collaboration system in accordance with an embodiment of the invention.

End-to-end integration is both an overall architecture and a series of IT solutions that address three key business issues: The integration of critical business information and logic that reside in enterprise production and legacy systems; the desire to incorporate Web-based e-commerce application; and the need to take advantage of integrated e-commerce, including the integration of business precesses with trading partners.

There is a general desire in the industry to develop new infrastructures for new B2B capabilities referred to as collaborative commerce. Collaborative commerce resembles an interactive, managed conference call of buyers and sellers. Real-time conversations among trading partners allow them to actively negotiate and execute business transactions, not just pass along information. Each and every B2B activity should be manageable as a seamless, integrated, and secure business event, regardless of how long this business transaction takes, or how many business parties or IT systems are involved—internally or externally.

The new economy has transformed traditional brick-and-mortar businesses into e-businesses, and this transformation directly affects the way companies collaborate with their customers as well as a multitude of trading partners. As such, e-business is of increasing importance to most companies from the corporation's business perspective, e-business collaboration among trading partners can help speed new products or services to market, improve customer service, reduce inventory and supply chain costs, and ultimately increase shareholder value. From a technology perspective, e-business extends the use of existing, proven IT systems and business processes to include external, disparate systems that are increasingly being accessed over the Internet. As a result, new groups of people, such as customers, suppliers, and distributors—who previously did not have access to these systems—are also directly exposed to the requirements and nuances of how these individual systems and business processes operate. But most importantly, access to these systems brings with it new access to information that was previously unavailable to all but insiders within an organization. With this information comes the ability to collaborate in ways and with partners that were previously unavailable to most parties.

E-Business is a real-time entity: interactive, customer driven, and highly competitive. The e-business winner will be the company—or set of companies—that can quickly and efficiently deliver products and services to partners, customers and end users with tight integration at all points along the value chain. Today's market leaders recognize that e-business is about creating a value proposition so compelling and a business experience so immediate and efficient that all partners and suppliers make doing business over the Internet a standard part of how they do business.

While the key drivers for B2B are speed and competition, collaboration between trading partners is the key to winning the game. Truly changing the rules requires real-time information exchange, transactional integrity, flexibility to adapt to changing market conditions, and integrated trading relationships between business partners. The stakes are high, and can make or break a company. The rules change daily, as every e-business executive can attest. These are the real e-business challenges. Meeting these challenges requires a different kind of B2B technology that can meet the real demands of collaborative commerce.

Good B2B infrastructure software should be readily configurable and rapidly deployable, while being part of a comprehensive and cohesive e-business solution. It should deliver time-to-market benefits now, with the ability to scale to meet future needs and interoperate with next generation applications. It should scale to handle any volume of B2B transactions, flawlessly and reliably, day-in and day-out, around the globe. It should enable a company to conceptually manage each and every collaborative commerce activity as a seamless, integrated and secure business event, making the firewall transparent to the business user while leveraging emerging Internet programming standards and security models to empower IT. Finally, this infrastructure should deliver new capabilities to dynamically add or change business partners on the fly, the power to model and manage partner relationships in all of their complexity, and the flexibility to enhance business processes to meet changing market conditions and customer demands.

These are the technology requirements for executing collaborative commerce strategies—and this is the area the present invention targets. As disclosed herein the invention defines an open, standards-based, and scalable software platform for dynamic business-to-business collaboration. The several benefits provided by the invention include:

1. Rapid Time-to-Market: IT execution is critical to companies that must extend their business to trading partners. Whether integrating the supply chain or launching new e-market exchanges, companies need to get into the B2B game today with technology that is readily configurable for rapid deployment—without the need for significant system re-writes, business process reengineering, or negotiation to install a common B2B partner application set. The solution should be easy and relatively inexpensive for partners to integrate in a non-proprietary fashion, with options for leveraging and extending existing investments in electronic data interchange (EDI), B2B applications, and emerging XML messaging standards such as RosettaNet. The system incorporating the invention is dynamic and simple to configure. Trading partners can be dynamically added and removed from the collaboration, helping to rapidly achieve the critical mass essential for marketplace initiatives—with the flexibility to make revisions as business models and partnerships evolve. Templates, easy-to-use graphical user interfaces designed for the business-level analyst, and configuration tools ensure that businesses can quickly design and execute mission-critical B2B processes.

2. Lowered Barriers-to-Entry: Trading partners can rapidly join and participate in an automated manner by simply downloading lightweight software which enables them to participate in trading activities. Additionally, the invention has been designed to provide support for multiple business protocols—to accommodate the diverse needs of multiple industries and diverse communities of trading partners.

3. Reliable, Layered Messaging Platform: Companies typically go-to-market rapidly with their B2B strategies, gaining an initial e-business foothold and then implementing the rest of the technology in phases. Although time pressures are intense, IT recognizes that it is high-risk and costly to invest in piecemeal technologies from multiple vendors that do not work together, cannot scale, and are not readily extensible. Individual e-business IT initiatives ideally fit into a single, comprehensive architecture that allows companies to get into the game quickly, yet be confident that they can successfully incorporate value-added business logic and build an integrated and high-performance B2B platform over time. To accomplish this, the invention provides a robust and reliable messaging platform designed specifically to meet the distributed, heterogeneous and loosely coupled nature of B2B e-commerce. Intelligent message routing and the ability to define the quality of service are an intrinsic part of the messaging platform. Additionally, a layered architecture provides a flexible means of adding new and emerging transport protocols to meet current and future requirements.

4. Comprehensive Conversation Management Capabilities: Complex B2B relationships require open, standards-based process technology that reliably defines and manages the execution of cross-enterprise processes. This process architecture must respect the autonomy of individual trading partners, while allowing the definition and management of common process agreements across trading partners. To be effective, this technology must be flexible enough to manage system-to-system processes as well as seamlessly incorporate humans and real-world interactions into the process. Unlike most B2C transactions which may involve a limited number of participants over a limited number of days (and, in some cases, hours), well-defined B2B interactions or "conversations" between trading partners may take weeks or even months to complete and may involve numerous participants. To meet these requirements, the invention may utilize a variety of sophisticated messaging protocols, including the extensible Open Collaboration Protocol (XOCP) which provides life cycle management of long-living conversations, and ensures the overall execution and completion of business processes.

5. Single Process Platform: While B2B technology must be rapidly deployable; it must also be powerful and flexible enough to support changing processes, evolving partner relationships, and new business models. It must support a variety of configurations ranging from centralized e-market administration to distributed partner-centric workflow integration. It must be straightforward and enable the user to add and change relationships without bringing the system down or compromising the integrity of transactions that are in progress. Embodiments of the invention provide end-to-end e-process management by interfacing with other third-party workflow products including the BEA WebLogic Process Integrator, a J2EE-compliant and XML-based process integration engine from BEA Systems Inc., San Jose, Calif. BEA WebLogic Process Integrator is one example of products that enable the effective, end-to-end management of system and application-based business processes, as well as traditional human-based workflow on both sides of a company's firewall.

6. No Need for Business Process Reengineering: The invention enables the creation of one or many virtual trading communities on the Internet, connecting trading partners in a conceptually free-standing environment with its own defined business processes. This unique design reduces the need for business process reengineering, enabling disparate trading partners to participate in public processes which take place within the e-market while allowing individual trading partners to define, implement and execute distributed, private business processes locally.

7. Internet Standards-Based: B2B is most valuable and effective when it is fully integrated from the back-end systems and extends out across the firewall to trading partners, regardless of the disparate IT systems and processes employed. Adhering to open industry standards such as Java, XML, and HTTP on nonproprietary systems optimizes partners' ability to integrate seamlessly and quickly. Standards-based technology also allows IT to leverage existing skill-sets rather than being forced to invest in something that is proprietary and cannot be replicated. To ensure rapid, efficient integration of partners, embodiments of the invention use a standards-based architecture leverages an HTTP communications protocol for information transportation over the Internet, as well as standards and concepts such as SSL, PKI and J2EE—reducing the need to dedicate internal IT resources to proprietary technologies.

8. Security: With trillions of dollars at stake, B2B commerce systems must support high transaction volumes and varying levels of traffic and throughput. Furthermore, this IT infrastructure must be 100 percent reliable and ensure the integrity and security of all interactions. Today's e-business not only stakes millions in B2B infrastructure and applications, but also puts its reputation with trading partners and customers on the line. Thus, the technology must have a well-designed architecture, and be compliant with the full range of emerging Internet security standards. The invention provides a trusted and secure platform for conducting B2B e-commerce, including built-in Internet security capabilities for data privacy, authorization, authentication, and an infrastructure to support non-repudiation.

9. Pluggable Business Logic and Protocol Support: Embodiments of the invention provide a plug-in architecture for dynamic and intelligent routing of messages. This enables market makers to design and implement business rules that meet their specific needs. Additionally, multiple business protocols such as RosettaNet and EDI can exist concurrently in the same deployment—reducing the need for all trading partners to standardize on one particular protocol. The invention also provides a flexible framework for rapidly implementing custom business logic that may be required to maintain a competitive advantage.

10. Proven, Scalable Technology: As B2B infrastructure vendors consolidate, it is increasingly critical to ensure that you will be fully supported by a strategic partner you can count on 24-hours a day, seven days a week, around the globe and well into the future. Embodiments of the invention can be designed to run on industry-leading transaction servers such as BEA WebLogic Server from BEA Systems, Inc., San Jose, Calif.

11. Interoperability: The invention uses an open and flexible architecture that can interoperate and leverage existing investments in EAI/B2B technologies as well as enterprise databases, Supply Chain Management (SCM), Customer Relationship Management (CRM), and mainframe systems. The invention also enables explanation of Common Object Request Broker Architecture (CORBA), Enterprise JavaBeans (EJB), Tuxedo, and COM+applications. This inherent flexibility provides a highly scalable and adaptable platform for the development and deployment of future B2B initiatives.

Glossary of Terms

DUNS—Data Universal Numbering System. A distinctive nine-digit identification sequence that is an internationally recognized common company identifier in global electronic commerce transactions.

PIP—Partner Interface Process. A protocol provided by RosettaNet that specifies the business messages exchanged, their vocabulary, and how to validate them. A number of these protocols have been defined for various types of business transactions (e.g.: TransferShoppingCart, QueryOrderStatus, etc.)

RosettaNet—Depending on its use in context, RosettaNet is either of the following definitions: An independent, non-profit consortium that is defining standard electronic business interfaces; or the business and transport protocol specified by this group.

XOCP—XML Open Collaboration Protocol. A protocol used by the collaboration server that provides more complete life cycle and management support for business interactions. XOCP is described in more detail later in this document.

Collaboration System

Roughly described, the invention comprises a collaboration server, which may itself be a component of a larger collaboration system. FIG. 1 shows an embodiment of the invention. As shown therein, a collaboration system in accordance with an embodiment of the invention includes a transaction in application server 102 operating as a base. Examples of transaction servers which may be used with the invention include the WebLogic Server product from BEA Systems, Inc., San Jose, Calif. The transaction server provides an application infrastructure upon which the collaboration system resides. Other transaction servers may be used. The application infrastructure ensures overall system availability, scalability, and security through the use of transaction processing, persistence, threading and components.

Atop the collaboration system sits a business process and workflow server 104. Examples of workflow servers that may be used with the invention include the WebLogic Process Integrator product from BEA Systems, Inc. The workflow server allows a company to define their business processes as a workflow. The workflow may take into account all aspects of a company's business from start to finish, including, for example, manufacturing processes, purchasing, sales, financial processes, etc. A key attribute of a workflow is that it be dynamic, flexible and configurable, i.e. that it may be readily modified to reflect a company's changing business model, to add new elements such as new product lines, and to account for new events as they occur. The workflow server also acts as an interface for a company's business application to plug into and utilize the workflow. Business application may include, for example, catalog management 106, dynamic pricing 108, order management 110, logistics 112, and payment applications 114.

In one embodiment of the invention, sandwiched between the application infrastructure server and the workflow server lies the collaboration server 116. The collaboration server is a key component in creating a collaboration system, and in bringing workflow management to the enterprise. The collaboration server allows separate companies, herein referred to as trading partners, to collaborate on complex tasks or projects. Such collaboration may extend, for example, to complex business projects, manufacturing processes, or logistical tasks encompassing many companies spread over many countries. As such, the collaboration server acts as part of a collaboration system to allow globally dispersed trading partners to share information and resources, and to work towards a common goal.

A key attribute of the collaboration server is the ability to interface with workflow processes running on a workflow server. To this end the collaboration server must be able to control the flow of information into and out of the workflows maintained by the workflow server. For collaboration among different companies the collaboration server must be able to do this for many workflows, and many workflow servers, and must be able to perform this task simultaneously, equally, and reliably. The collaboration server of the invention does this by means of a sophisticated routing and filtering mechanism. Messages from different trading partners, or in some instances the workflows of different trading partners, are filtered by the collaboration server, and routed to the appropriate recipients in a true collaborative fashion.

Figure 2:
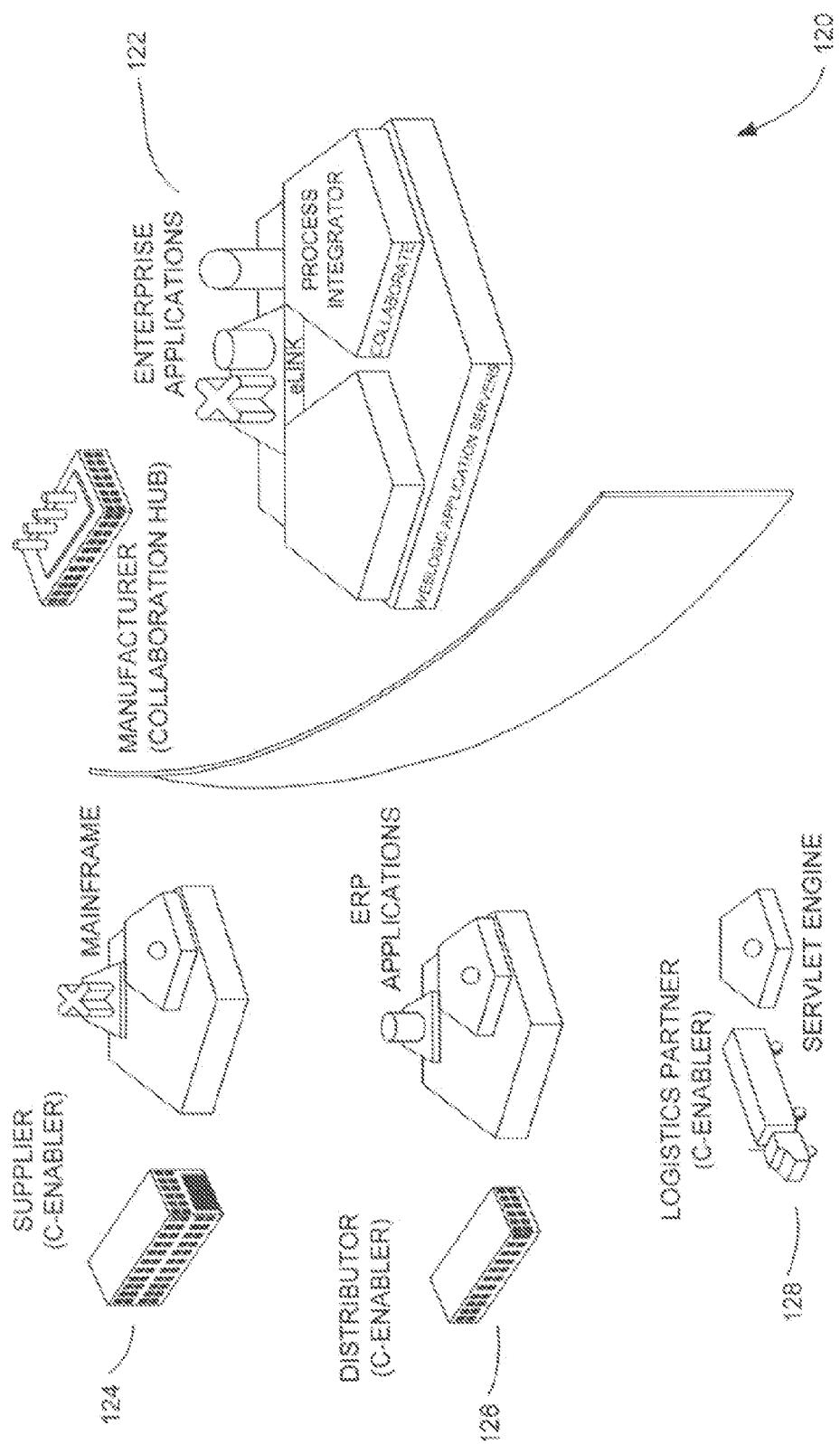
FIG. 2 is an illustration of a network of collaboration partners in accordance with an embodiment of the invention.

FIG. 2 illustrates a real-world example of how the invention may be used. As shown in this particular example, a manufacturer may employ the invention to create a collaboration system. The manufacturer 122 is responsible for maintaining and administering the system which may include an application server, a workflow server, and a collaboration server. In combination, these collaborative components may act as a trading hub or clearing house for trading partners to collaborate with the manufacturer. As shown in FIG. 2, suppliers 124 and distributors 126 that act as trading partners with the manufacturer may participate in the collaborative process. Each of these entities may have their own workflow servers and workflow processes that may interact with the manufacturer's workflow process. Other entities, for example a logistics partner 128, may participate in the collaboration system without any need for their own workflow server. As may be seen, a particular entity or trading partner need not have its own workflow process to take part in a collaboration system, but in those instances where the trading partner does have its own workflow, the invention can make use of it and integrate (at least portions of) it into the collaborative enterprise workflow.

Figure 3:
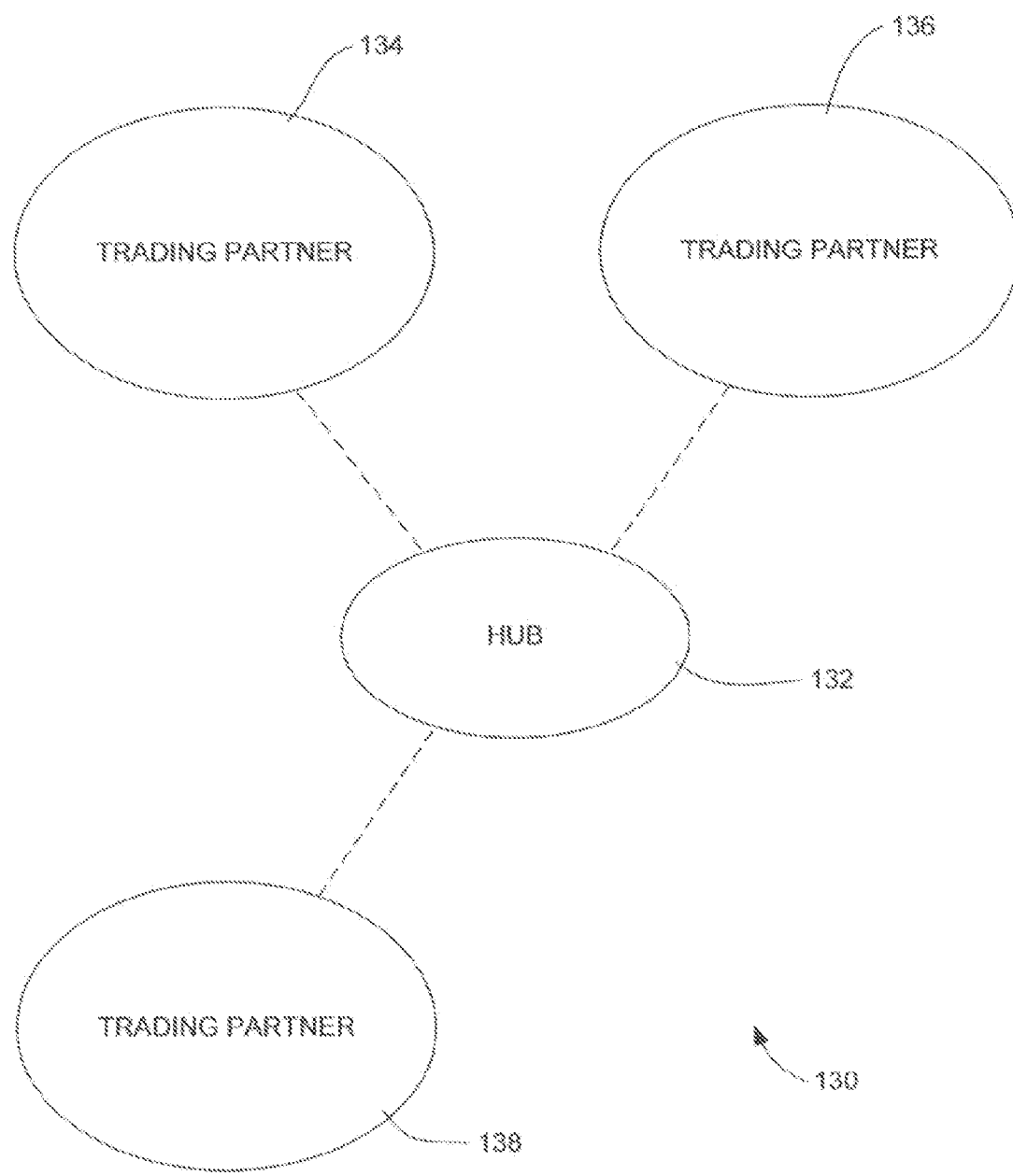
FIG. 3 is a schematic of a control hub and trading partners in accordance with an embodiment of the invention.

FIG. 3 shows an initial step in preparing the invention for use in an enterprise. A company wishing to use the collaboration system must first develop a central point 132 or hub at which to build the collaboration system, and identify the trading partners 134, 136, 138 that will participate in the collaboration system. Typically, the hub is developed and maintained by a large manufacturer who may wish to streamline their materials procurement and manufacturing processes, but the invention is not limited to such users, and indeed the collaboration system and c-hub may be built by any entity including suppliers, resellers, distributors, logistics providers, purchasers, market makers, e-portal providers, and others. The trading partners may likewise be any of these entities or anyone else interested in participating in a complex e-commerce business project.

Figure 4:
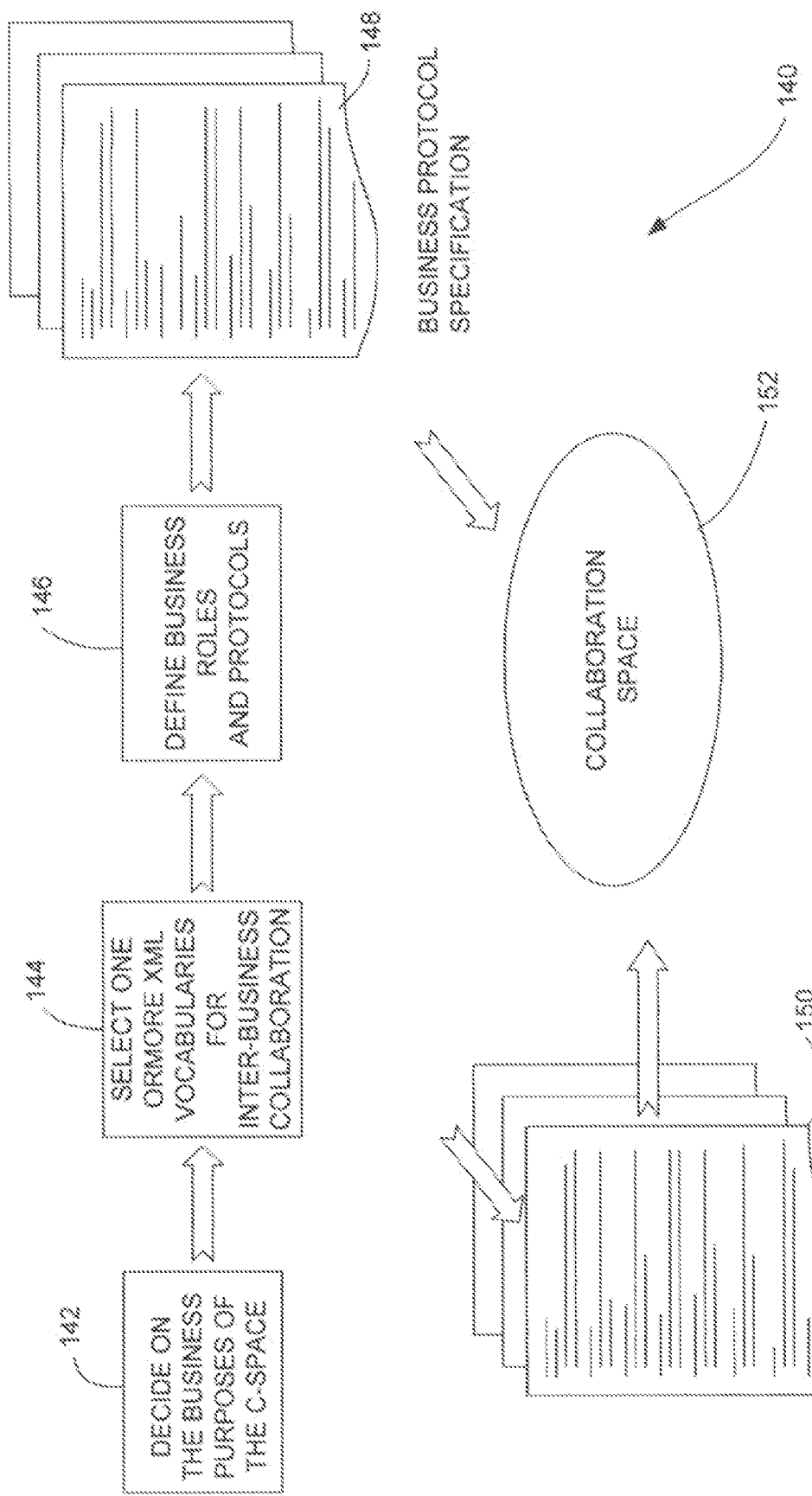
FIG. 4 is an illustration of a c-space creation process.
Figure 5:
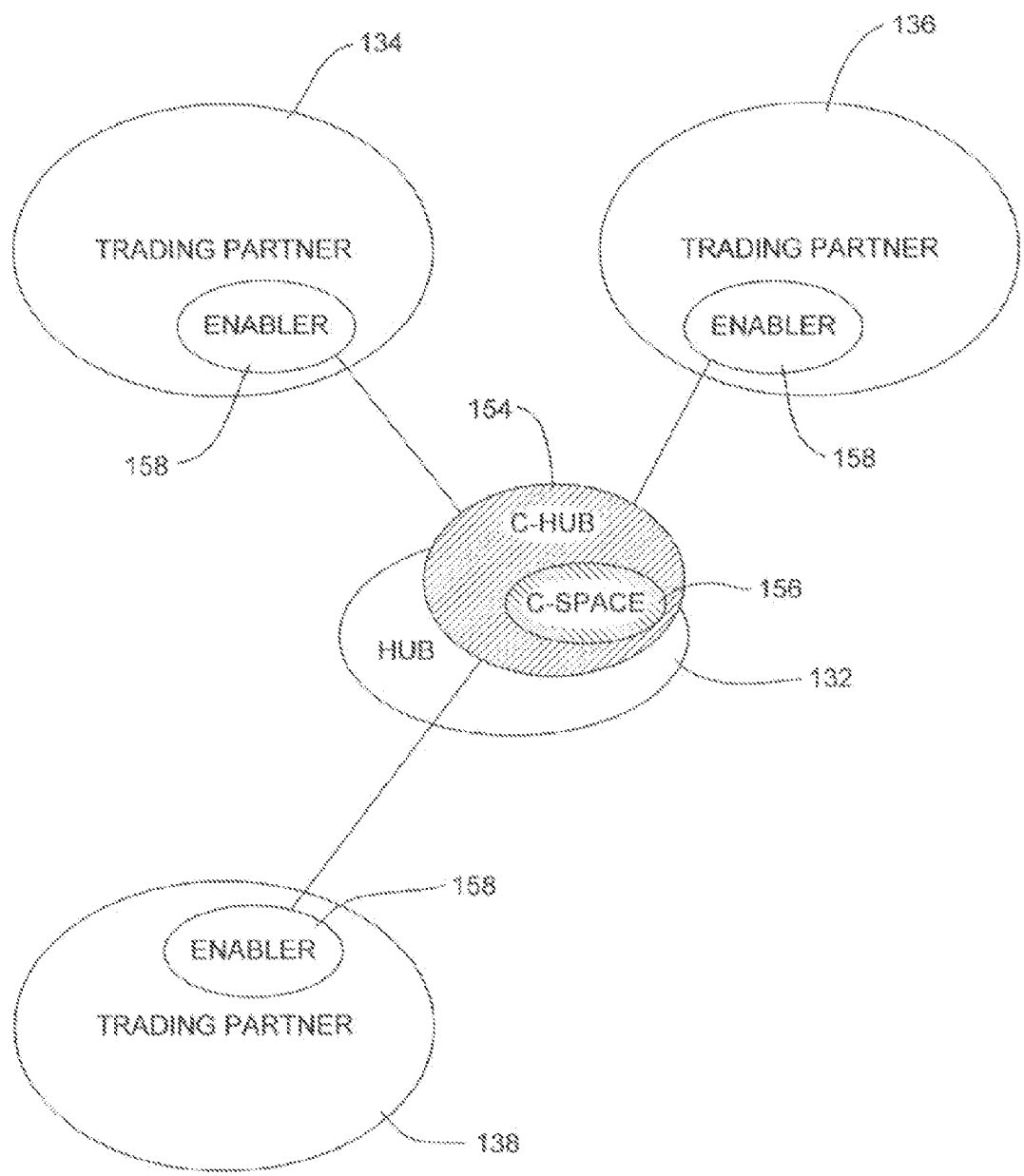
FIG. 5 is a schematic of a collaboration system with hub and trading partner enablers in accordance with an embodiment of the invention.

The development of the collaboration space is shown in FIG. 4. A company must first decides on the business purpose of the c-space, define a vocabulary, and a set of protocols, and provide a specification. FIG. 5 shows the installation of the c-space into the collaboration system. The central collaboration provider installs a collaboration hub, or c-hub 154, most likely at their place of business but the c-hub can be installed anywhere geographically, such is the benefit of a global e-commerce solution. The c-hub controls a collaboration space, or c-space 156—an abstract structure wherein collaboration messages are transmitted back and forth between trading partners in a continuous conversation-like manner. Trading partners use collaboration enablers, or c-enablers 158, software applications allowing them to send messages to, and receive messages from, the c-hub. The enablers may also interface with workflow processes and servers at the trading partners' location so that such messages are generated and received automatically. The messages can be in any format—the invention is designed to be flexible in the type of messaging the c-hub understands. For standardization purposes and to ensure the widest usage of the invention, in one embodiment industry standard XML messages can be used. The enabler may then send and receive such XML messages to and from the c-hub by any convenient means, including the Internet. In this manner the invention allows geographically distant trading partners to communicate workflow processes easily, with minimal communication cost, and with little or no change in their current workflow technology.

Collaboration System Architecture

In one embodiment the collaboration system may utilize many components, including:
- a c-hub
- a c-space
- a conversation manager
- a c-space enabler (enabler)
- a workflow integrator (workflow server)

Not all of these components need be installed centrally, on the same server, and indeed the c-space enabler is more likely to be installed at a remote trading partner location than at any central hub location. The c-space enabler, or simply the enabler, is however an important part of the enterprise-wide collaboration solution. Other components, such as the workflow integrator are optional, and while not necessary for participation in the collaboration network, greatly increase the potential benefits to any company or participant using a workflow to model their business processes.

Collaboration Hub (C-hub)

The c-hub is the centerpiece of the collaboration server. It is responsible for routing messages between various c-enabler components and for managing the lifecycle of the various conversations between the participating trading partners. The invention uses a c-hub which provides the following functionality:

- A modular hub: The c-hub allows for the easy addition of code at various well-defined points.
- Logic Plug-Ins: At well-defined plug-in points, customers may be allowed to introduce their own code. These plug-ins, referred to as "Logic Plug-Ins", allow the customer to provide additional processing of the information passing through the c-hub. cProtocol Plug-ins: An extended type of Logic Plug-In is a "business protocol plug-in", which provides support for various business protocols other than the out-of-the-box XOCP support such as the RosettaNet router.
- URLs for c-spaces: To support the use of c-spaces by non-XOCP business protocols, in one embodiment all c-spaces require a unique URL per business protocol supported by that c-space. This allows the c-hub to unambiguously identify the proper c-space and business protocol of incoming messages.
- RosettaNet Protocol Plug-in: A special business protocol plug-in that allows the c-hub to function as a router for RosettaNet (non-XOCP) business conversations.

Figure 6:
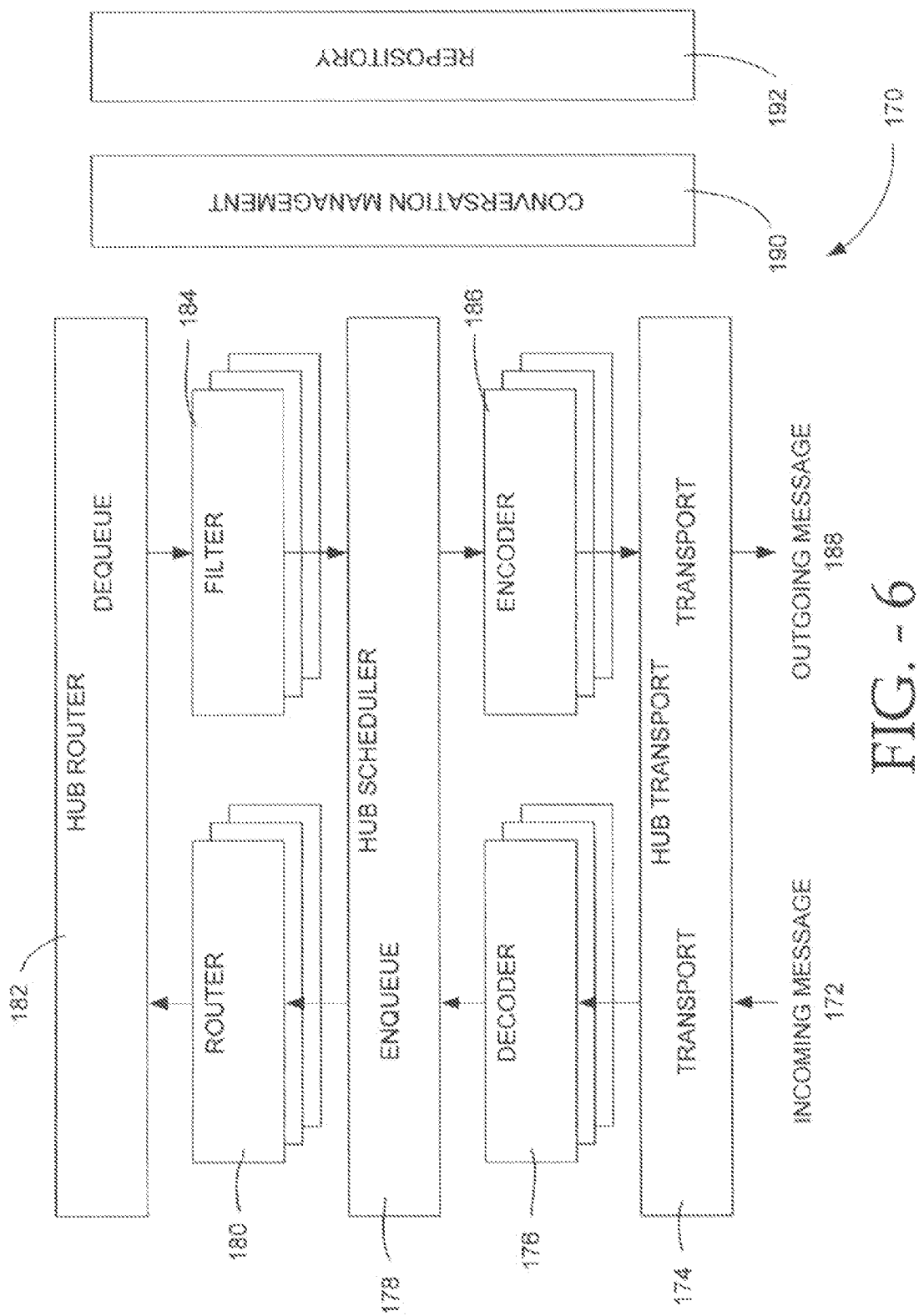
FIG. 6 is a schematic of a c-hub in accordance with an embodiment of the invention.

FIG. 6 shows the c-hub architecture, as well as the normal flow of business messages through the c-hub: This is a somewhat simplified layout that will be expanded upon later. However, it provides the overall picture of the c-hub. The important points to note are:

- The central c-hub components (transport 174, scheduler 178, and router 182) make up an integrated infrastructure.
- The decoder 176, encoder 186, conversation manager 190, and repository 192 components may be made available for customers to change or access.
- The router 180 and filter 184 components are customizable by the customer. The invention provides default implementations for XOCP and RosettaNet support.
- Multiple components (or "chains") in each quadrant are allowed.

The message flow through the c-hub begins with an incoming message 172 from a trading partner via proceeds to the hub router, and then proceeds down as an outgoing message 188 to the recipient trading partner or partners, as indicated by the arrows. The two sides of FIG. 6 are usually described from the perspective of the client or trading partner and are herein referred to as the publish side (left side) and receive side (right side).

Figure 7:
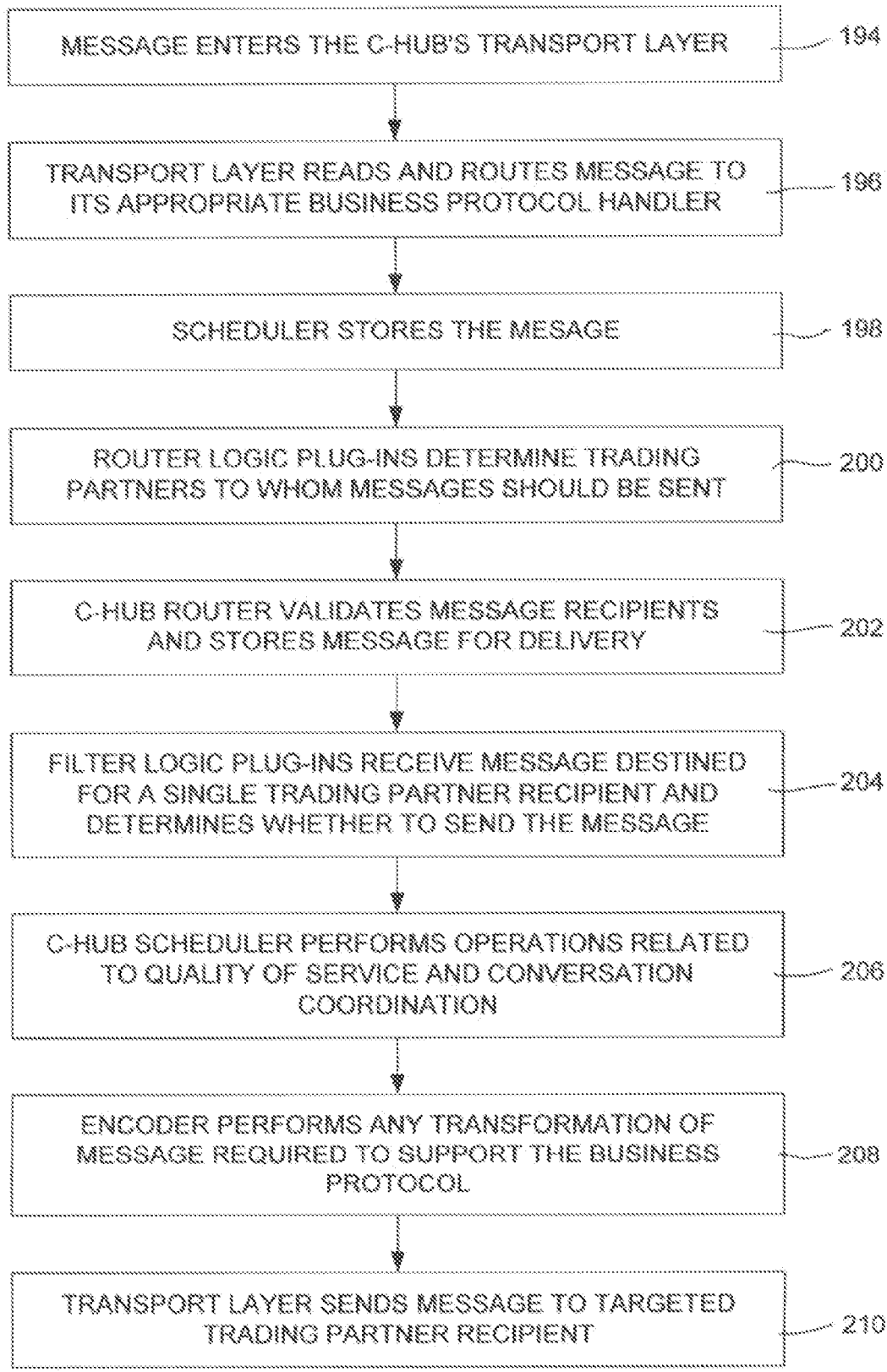
FIG. 7 is a flowchart of a message flow process in accordance with an embodiment of the invention.

The main characteristics and contractual obligations of each component are illustrated in the flowchart FIG. 7 and can be summarized as follows:

1. The C-hub Transport 194:

The incoming message is read and routed to an appropriate decoder chain based on the message protocol (e.g.: XOCP, RosettaNet, cXML, etc.). In one embodiment, that defines c-spaces in terms of URL's, the URL on which the message is received serves to identify both the protocol being used and the destination c-space.

2. The Decoder chain 196:

Any protocol-specific headers in the message are processed by the decoder and the appropriate business protocol handler is assigned. The sending trading partner is also identified. The sending trading partner is then enlisted in a conversation, and a reply is prepared to be returned to the sender.

3. The C-hub Scheduler 198:

The message is stored for subsequent retrieval.

4. The Router Chain 200:

The trading partners to whom this message should be routed are determined. Logic Plug-Ins can add or remove recipients from this list.

5. The C-hub Router 202:

Final validation of the message recipients is performed, and the message is stored for delivery to the targeted trading partners.

6. Filter chain 204:

A message destined for a single trading partner recipient is received and a decision is made on whether to send the message. Filter logic plug-ins may be used to add or remove this message from this recipient's receive mechanism.

7. The C-hub Scheduler 206:

Internal operations relating to quality of service issues, conversation management, etc. are performed if the message is still schedules for sending to a recipient.

8. Encoder chain 208:

The encoder performs any transportation of the message required to support the business protocol of the recipient.

9. C-hub Transport 210:

The C-hub transport layer sends the message to the trading partner recipient.

For each module chain, the main responsibility is as indicated above. This contract must be fulfilled in order to ensure proper message processing and delivery. As long as the contract is fulfilled, other modules in the chain are relatively unencumbered in terms of the processing that they may be required to provide.

Collaboration Space (C-space)

Figure 8:
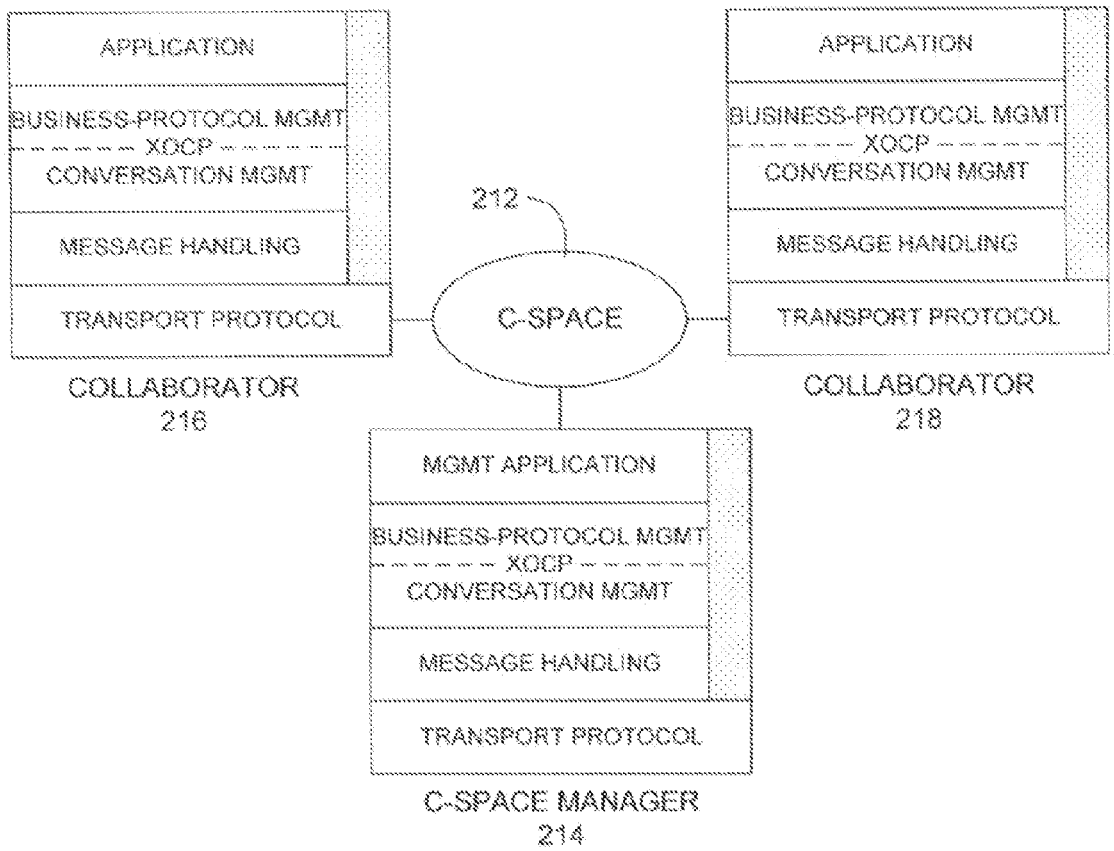
FIG. 8 is a schematic of a c-space in accordance with an embodiment of the invention.

A primary component of the invention is the c-space. FIG. 8 shows an example of a c-space 212 shared by many buyers, sellers and other entities. The c-space is an abstraction supporting a single business model, business message protocols, a secure message space, security policies, quality of service policies, and a registered set of business trading partners. The c-space contains message vocabularies, business process models, participant roles, and other e-market metadata that are essential to the creation, deployment, and ongoing maintenance of trading activities.

Using the invention, a c-space owner 214 can create any number of concurrent c-spaces, each supporting any number of trading partners. Within a c-space, the invention provides asynchronous XML messaging capabilities to allow loosely coupled communication between trading partners 216, 218. This model leverages routing and filter functionality that can be associated with messages in order to classify the set of trading partners that should receive a message, allowing partners and their interactions to be managed individually, based on their role or trading preferences within an e-market.

The c-hub is the execution engine of a c-space, allowing the c-space owner and trading partners to create, route, and manage messages within the trading environment. To facilitate the execution of business transactions across a disparate base of trading partners, one embodiment of the invention uses XML as its e-business messaging semantic. FIG. 5 shows some XML transfer paths between trading partners (using c-enablers), and a trading hub hosting a c-space.

Within, as well as outside of a c-space, XML offers tremendous advantages as a universal format for messages passed between trading partners because it provides a common syntax to structure information. However, XML by itself doesn't solve the interoperability problem, as collaborating entities must agree on the semantics of business protocols for this information. The invention is independent of business protocol message vocabulary, so it can support any standards-based or proprietary business protocol or vocabulary. As such the invention delivers the ability to support multiple protocols within the same c-space as well as to extend a c-space through supplemental protocol handlers or business logic plug-ins.

Within the context of B2B e-commerce, well-defined and ordered sets of related messages are exchanged between trading partners. This collective set of messages or "conversation" involving two or more trading partners can often span days, weeks, or even months. To manage these unique conversations, embodiments of the invention implement an extensible Open Collaboration Protocol (XOCP), which provides the ability to specify both the information (vocabulary) and business protocol (process flows) for a given conversation. As conversations and business processes are initiated, executed and completed, conversation management software tracks and manages these long-living conversations, ensures that they are completed, and orchestrates the overall process execution.

The invention allows the powerful business process management and workflow capabilities of workflow server products such as BEA WebLogic Process Integrator to provide the infrastructure to facilitate conversations within the c-space. The innovative architecture allows each trading partner to handle the implementation of their own business process and rules locally, while conforming to the rules of engagement (defined by the global information and business protocols) for a given c-space.

Features include:
Transport-protocol independent (for example http/https)
Business-protocol independence (cXML, BizTalk, RosettaNet or any proprietary business documents)
Definition of conversations including process and vocabulary definition
Allows definition of quality of service (QOS) parameters for a message (e.g. guaranteed delivery)
Provides a mediated messaging model, with support for both publish and receive filters
Supports user-defined message routing and filtering
Flexibility to apply message or data content transformation Given the complexity, duration, and volume of business transactions required between trading partners conducting collaborative commerce, an effective solution must provide functionality to address these specific requirements. Unlike traditional solutions, the invention provides a unique approach to managing on-going interactions between individual trading partners as well as the context of each conversation within a c-space.

Conversation Management

Within the context of B2B e-commerce, well-defined and ordered sets of related messages are exchanged between trading partners. This collective set of messages or "conversation" involving two or more trading partners can often span days, weeks, or even months. To manage these unique conversations, embodiments of the intention provide a collaborate system that implements the eXtensible Open Collaboration Protocol (XOCP) described in further detail below, which provides the ability to specify both the information (vocabulary) and business protocol (process flows) for a given conversation. As conversations and business processes are initiated, executed and completed, Conversation management software tracks and manages these long-living conversations, ensures that they are completed, and orchestrates the overall process execution.

Within the collaborative system defined by the invention the powerful business process management and workflow capabilities of workflow products and workflow servers such as, for example, the BEA WebLogic Process Integrator provides the infrastructure to facilitate conversations within the c-space. Additionally, the invention's innovative architecture allows each trading partner to handle the implementation of their own business process and rules locally, while conforming to the rules of engagement (defined by the global information and business protocols) for a given c-space.

Conversation context is another important aspect of managing conversations within a given c-space. Each conversation has a unique context that enables users to manage multiple, concurrent conversations taking place in the c-space. The collaboration server uses context information to help ensure that messages from one conversation do not get tangled up with messages from another. For example, an individual trading partner may be requesting proposals or negotiating prices with multiple vendors concurrently, and must maintain the integrity and security of each interaction.

Figure 9:
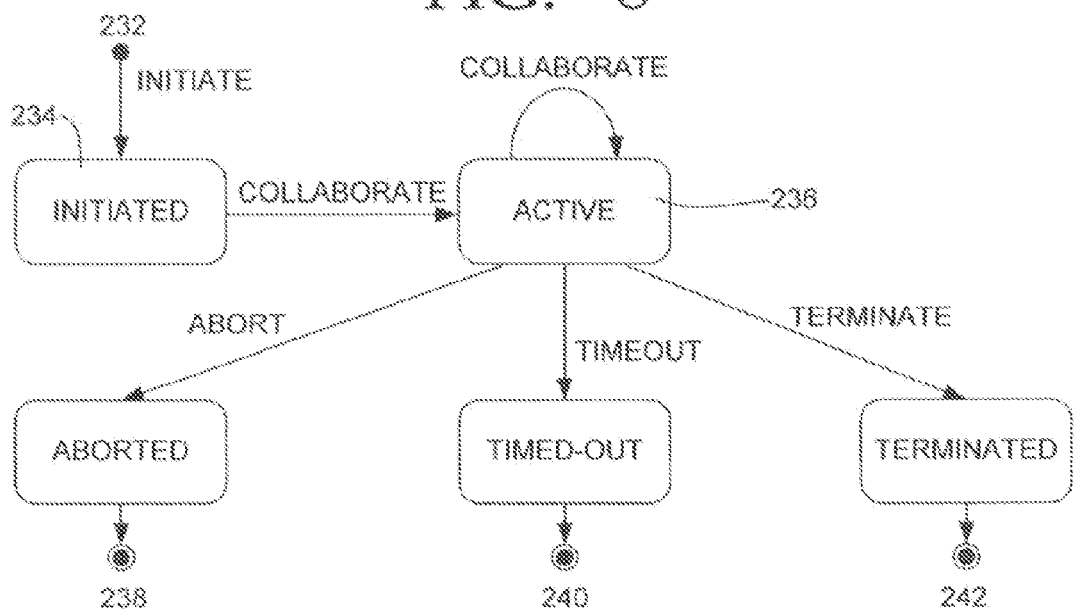
FIG. 9 is a schematic of a conversation initiation in accordance with an embodiment of the invention.

FIG. 9 illustrates a schematic of a conversation lifecycle as managed by the conversation manager. The conversation process is dictated by the actions of three types of participants—conversation initiators, conversation terminators, and regular conversation participants. These roles are fully interchangeable in that a conversation initiator (an initiator) may also act as a conversation terminator (a terminator). Regular conversation participants may become terminators, and so on. Collectively these participants are known as collaborators. Conversations between and amongst the collaborators creates the e-commerce collaboration environment.

As shown in FIG. 9, the conversation is first started or initiated 234 by an initiator 232. The conversation then enters an active phase 236. During this phase the actual process of message sending, routing and receiving takes place among the conversation participants. The conversation flow is coordinated by a conversation manager. This role may be played by any of the participants but is usually played by the central participant who is typically also responsible for managing the c-hub and the c-space. The conversation manager is responsible for generating conversation id's, registering participants in the conversation, maintaining the status of the conversation, and delivering conversation abortion or termination messages. As shown in FIG. 9, a conversation may end by any of three means—either the conversation is aborted 238, perhaps due to error, or a change in conversation criteria; timed-out 240 due to the conversation period extending beyond its scheduled timeframe; or terminated due to the conversation having achieved its end result 242.

Figure 10:
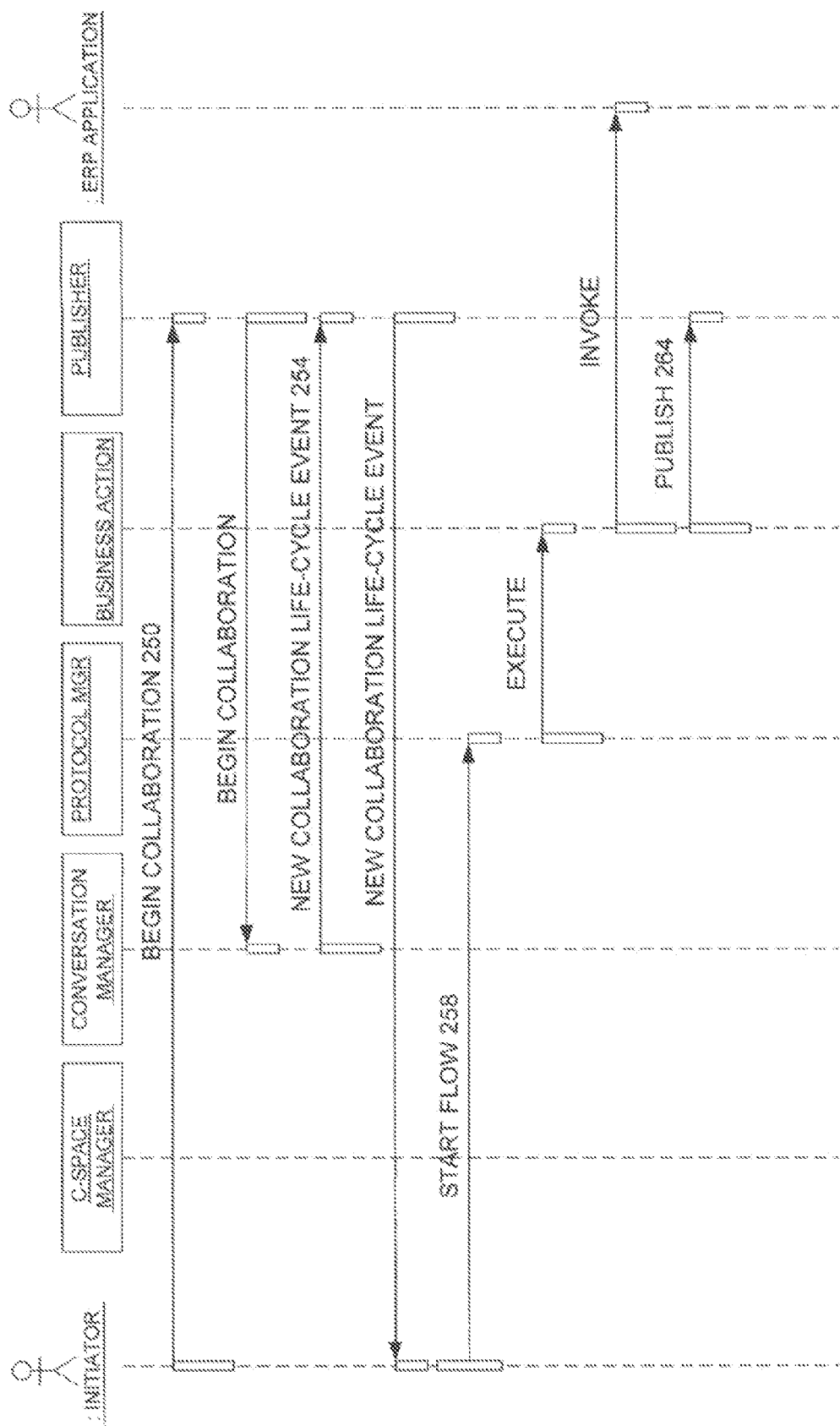
FIGS. 10–13 are message flow diagrams of an example conversation in accordance with an embodiment of the invention.

FIGS. 10–13 illustrate possible steps in the lifecycle of a typical conversation. In FIG. 10 the conversation is initiated by an initiator 250. The initiator must begin the collaboration process, start a new collaboration life cycle 258, initiates the flow of messages among the c-space, and then starts the execution and publishing 264 of such messages so that other participants may join in the conversation.

Figure 11:
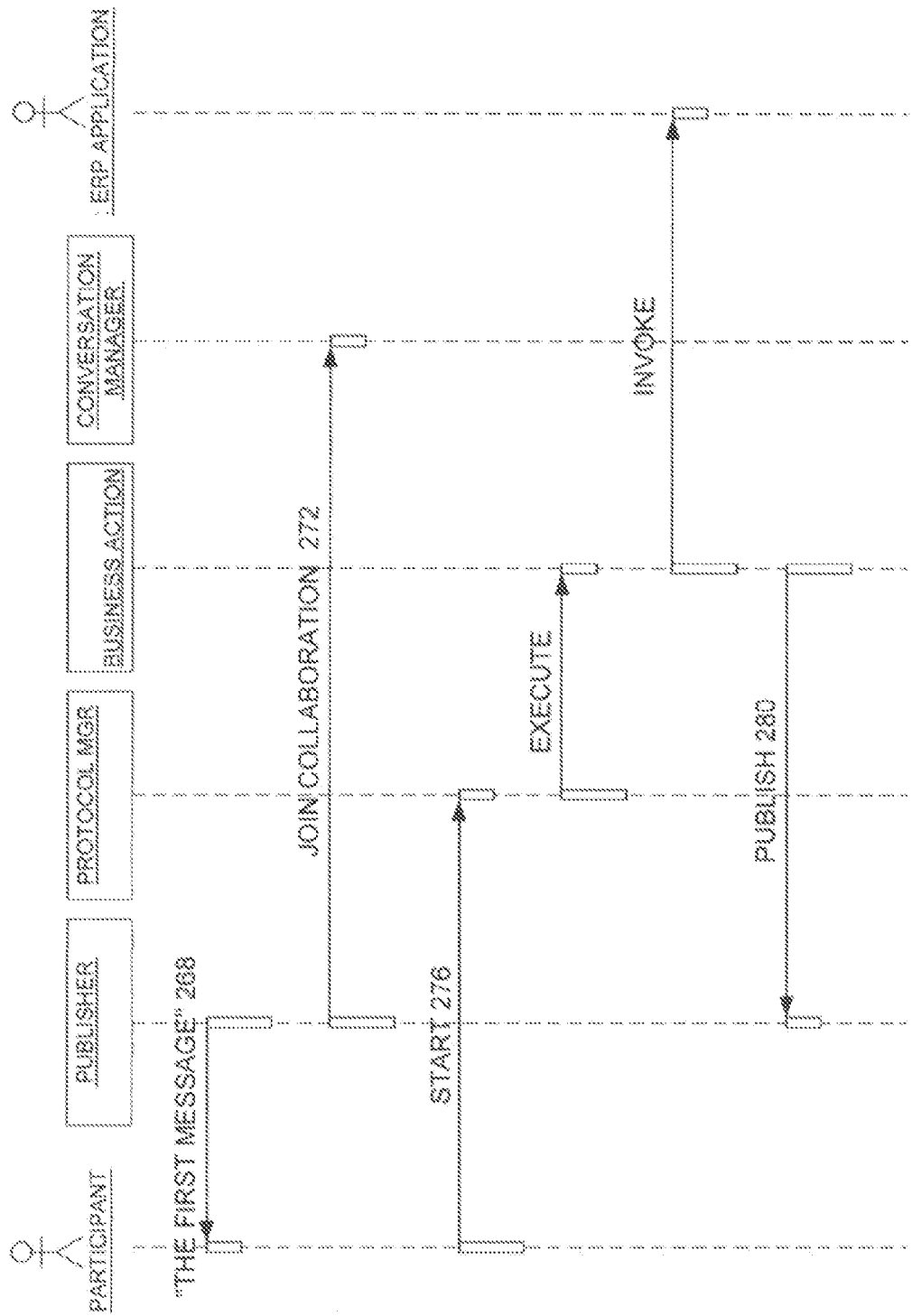

FIG. 11 illustrates how a participant joins in the conversation. Having received the first message 268 from the initiator, via the c-space, the participant decides to join in the conversation 272, again through an execute and invoke process. From that point on the participant receives all published messages 280 from the conversation manager that are intended for delivery fo that particular participant.

Figure 12:
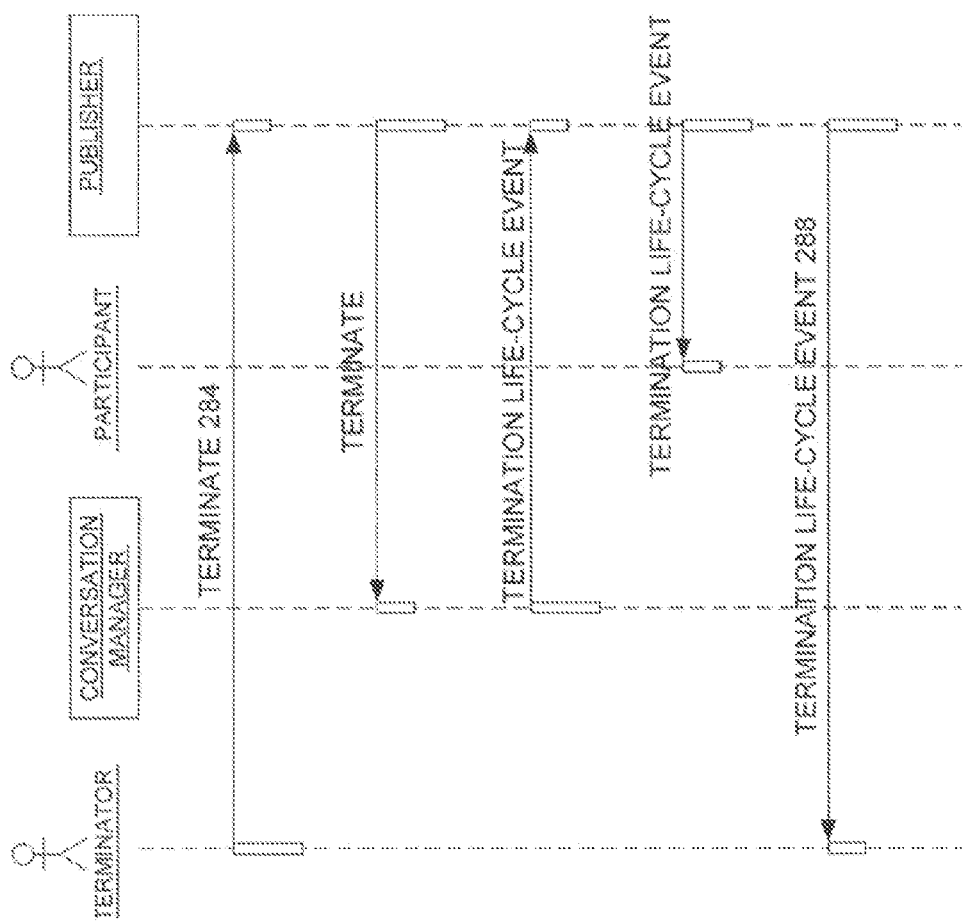
Figure 13:
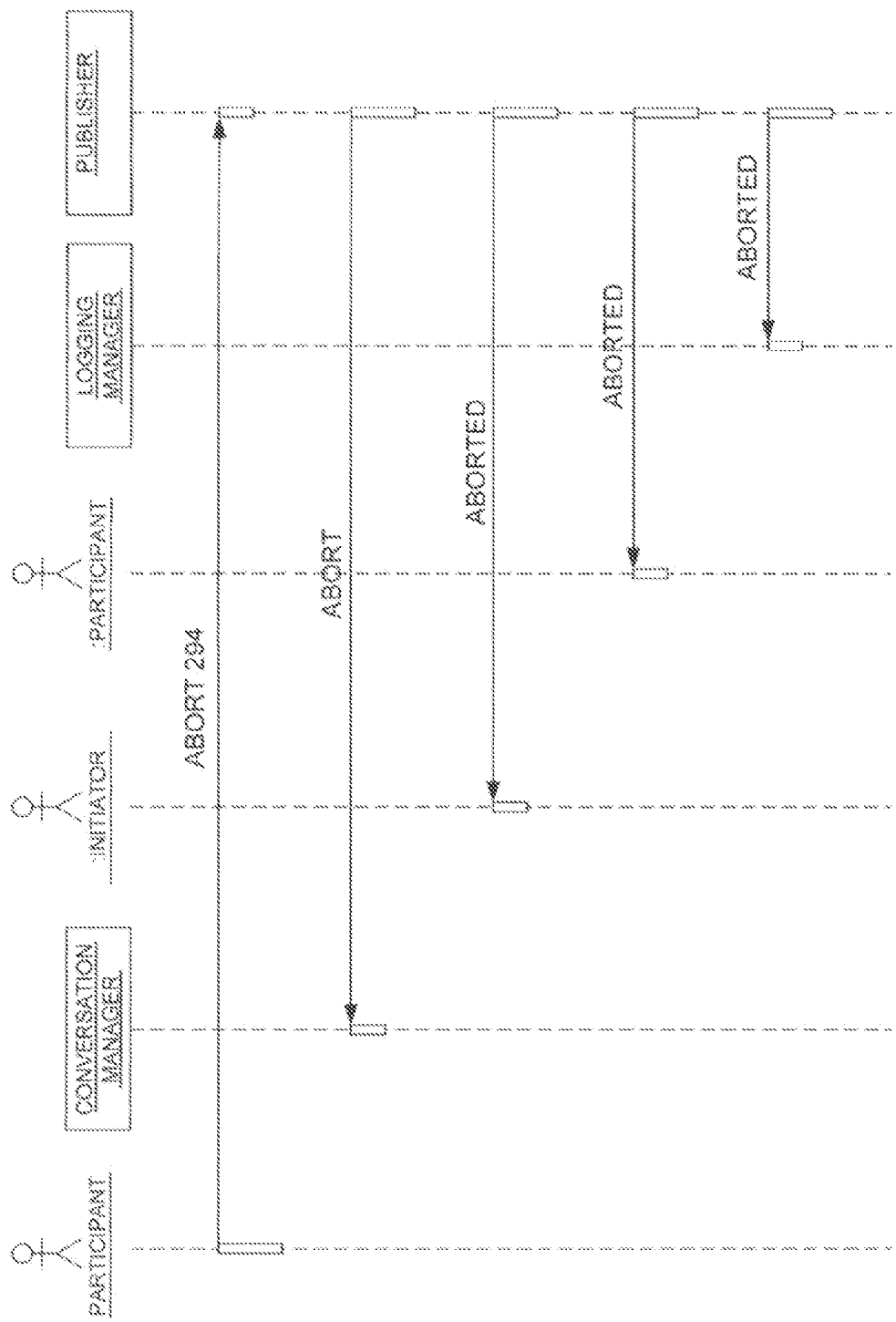

FIGS. 12 and 13 illustrate two alternate means for finishing a conversation. In FIG. 12 the terminator communicates to the message publisher that the conversation should be terminated 284. The conversation manager clearly kills the conversation and notifies the participants accordingly 288. FIG. 13 shows an alternate means of finishing a conversation in which a participant requests that the conversation be aborted 294. The conversation manager then coordinates sending abort messages to all the participants. Abort messages may be sent via a publisher under coordination of the conversation manager.

Figure 14:
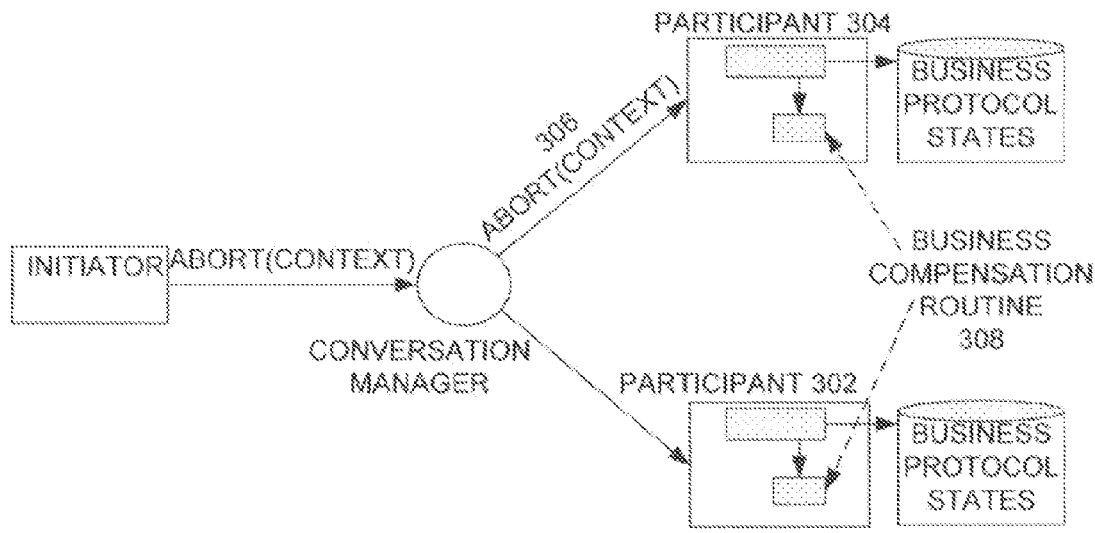
FIG. 14 is a schematic of a conversation termination process in accordance with an embodiment of the invention.

A primary difference between the two means of conversation finishing illustrated in FIGS. 12 and 13 is that conversation termination normally occurs as a result of a successful outcome to the conversation among the conversation participants, whereas conversation abortion is usually used as an instantaneous interruption mechanism that does not normally produce a successful outcome. FIG. 14 illustrates a compensation mechanism that may be used to rectify unsuccessful outcomes of aborted conversations. A business compensation routine 308 is used to signify that two participants 302, 304 may participate in a conversation on an equal basis, i.e. they provide equal input to the enterprise workflow. If one participant which is currently taking part in a conversation receives a conversation abort message 306, the compensating participant may take its place, depending on the reasons that caused the original abort message. If the entire conversation was aborted, then there may be no conversation for the compensating participant to join.

URL Accessible C-spaces

C-spaces are a useful, but generally XOCP-specific, concept. Most existing standard business protocols like RosettaNet and CXML do not use the concept of c-spaces or partitioning. Many of these protocols are point-to-point oriented, and do not even have the concept of multi-cast. To increase accessibility and ease of integration, embodiments of the invention preserve the c-space concept for XOCP, and introduce it for non-XOCP business protocols. In order identify a particular c-space and a business protocol, each c-space/business-protocol combination may have a unique uniform resource locator (URL). A client can use this URL in order to access a particular c-space using a particular business protocol. This also allows a single c-space to support multiple business protocols by using multiple URLs.

A c-space might have more than one URL to help identify special additional processing that may be required to support multiple business protocols or to handle variations in business protocol implementations. For example, a c-space may have a RosettaNet orientation, but participants may be using RosettaNet implementations from different vendors. Variations in the different implementations can affect how the decoder needs to process the information for routing purposes. One way to handle such a situation is to have a single decoder try to apply some heuristics to determine from which protocol variation a message is being received, and then process the message accordingly.

An alternative solution is to have the c-hub provider assign a separate URL for clients using each of these variations within a single c-space. In this approach, each message can then be routed to the specific Decoder that knows exactly how to handle the type of message being received.

Through the use of different URLs, a single c-space can support multiple protocols. These protocols can be quite dissimilar (e.g.: RosettaNet and XOCP).

Collaboration Enabler

In accordance with one embodiment of the invention a Collaboration Enabler (c-enabler) is a lightweight, readily downloadable software that enables a trading partner to participate in a c-space. A trading partner must be identified and authorized by the c-space owner or administration in order to activate the c-enabler and actively participate in a c-space. One of the security protocols supported the system is the X.509 certificate, which can be authorized by the c-space administration and granted by a Certificate Authority. The trading partner can then be authorized by the c-space administration (based on conversation types, business documents, and roles) to participate in a particular c-space. Like the c-hub, the c-enabler can easily integrate with applications running on other application servers and reduces the barrier-to-entry for trading partners who want to participate in the c-space.

In one embodiment, the minimum configuration requirement to run the c-enabler maybe designed to run on a servlet engine, for example the BEA WebLogic Express servlet engine. For complex B2B scenarios, many organizations may benefit from the use of a robust process management tool such as BEA WebLogic Process Integrator, a workflow server and integration product described in detail below, which runs on BEA WebLogic Server.

Workflow Integration

Workflow products and servers may be integrated with embodiments of the invention to manage complex e-business processes between multiple trading partners. Together they provide a federated process model among trading partners, where market processes are defined globally but deployed in a distributed manner with local processes being modeled and executed at each trading partner's site. The invention provides the overall management and coordination of these distributed processes as part of the product's conversation management functionality.

Workflow server products such as BEA WebLogic Process Integrator from BEA Systems, Inc. provide the ability to graphically model partner-based business processes. This tool also provides graphical design functionality for open business processes such as RosettaNet Partner Interface Processes (PIPs), which govern processes across the global information technology supply chain. RosettaNet PIPs enable companies to deploy standards-based, interoperable applications for supply-chain functions and to optimize networks of suppliers, manufacturers, and distributors.

While collaborative commerce is driven by the desire to automate and streamline e-business processes, one can not completely eliminate the ability to involve humans in the execution of e-business processes. Unlike other B2B platforms, the invention's process capabilities provide the ability to define and direct e-business process exceptions to human users for resolution. The combination of a collaboration server and a workflow server in one collaboration system also delivers unparalleled flexibility to drive and integrate cross-enterprise collaborative processes, enterprise applications, and transactions on either side of the firewall using a single process technology.

Integration Server

Figure 15:
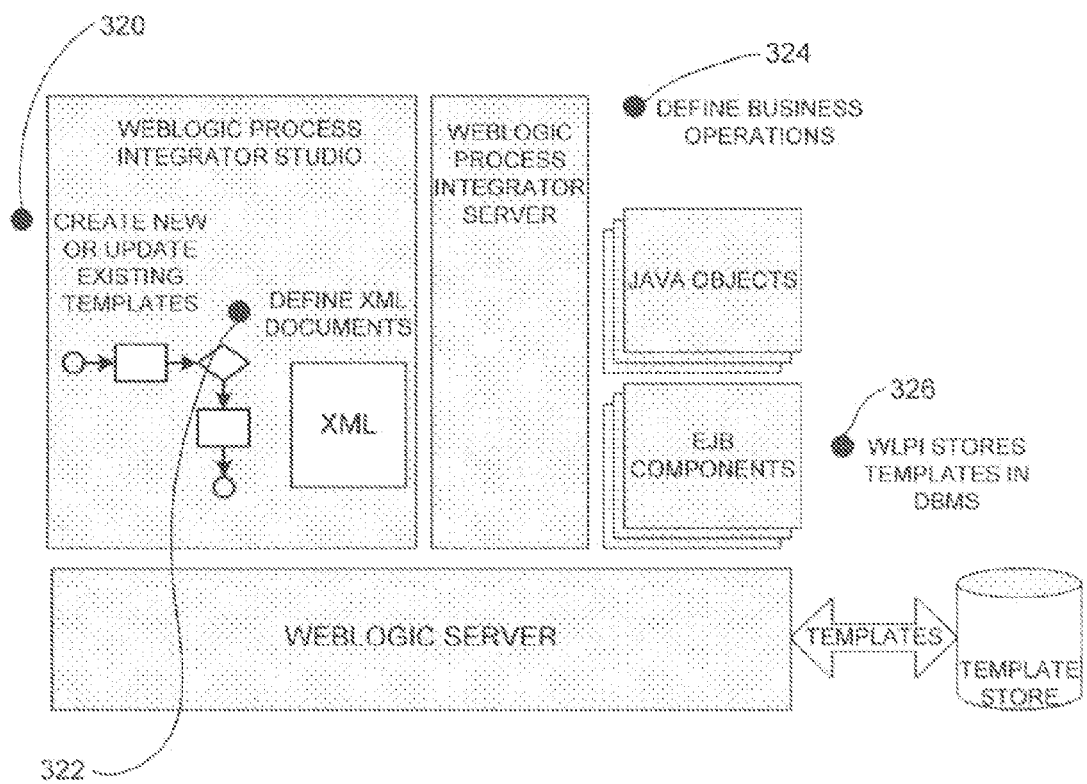
FIG. 15 is an illustration of a workflow server design process in accordance with an embodiment of the invention.

FIG. 15 illustrates schematically the architecture of a typical workflow server. Although the workflow server shown here is a Weblogic Process Integrator server from BEA Systems, Inc., the key elements are common to many workflow server, and the invention is flexible enough to work with any similar product. As shown in FIG. 15, the workflow server must first be initialized (at design time) to have a workflow. This is typically done by creating a new workflow template 320, and using this template to define an XML document 322. The company then defines a set of business operations 324 and stores these with the templates in a workflow template database 326.

Figure 16:
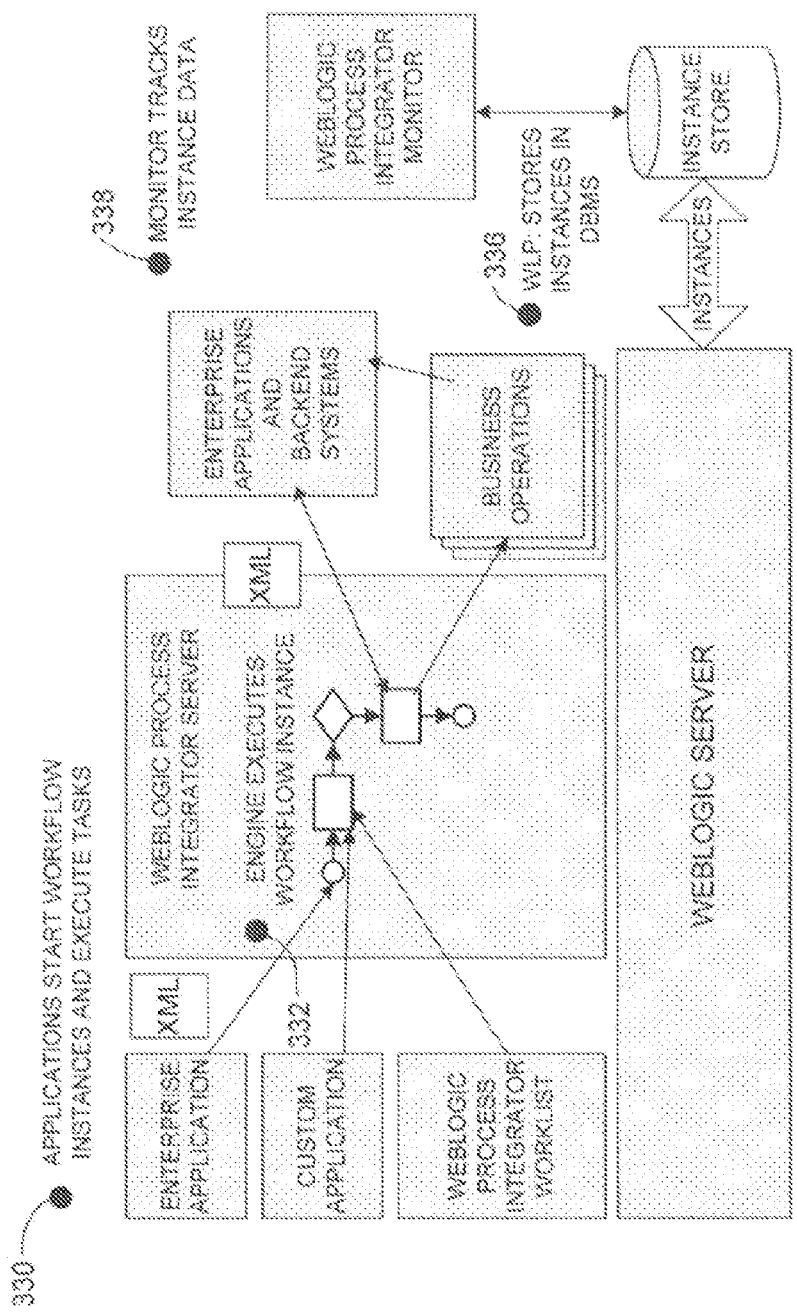
FIG. 16 is an illustration of a workflow server run time process in accordance with an embodiment of the invention.

At run time, shown in FIG. 16, enterprise applications start workflow instances based on the saved workflow templates. The workflow server executes these instances to effect the workflow 330, and as a result affect other business operations, enterprise applications and backend systems. The workflow instances, and hence the communications between the enterprise applications and the workflow server, use an XML format. This allows for portability and ease of integration with other systems.

Figure 17:
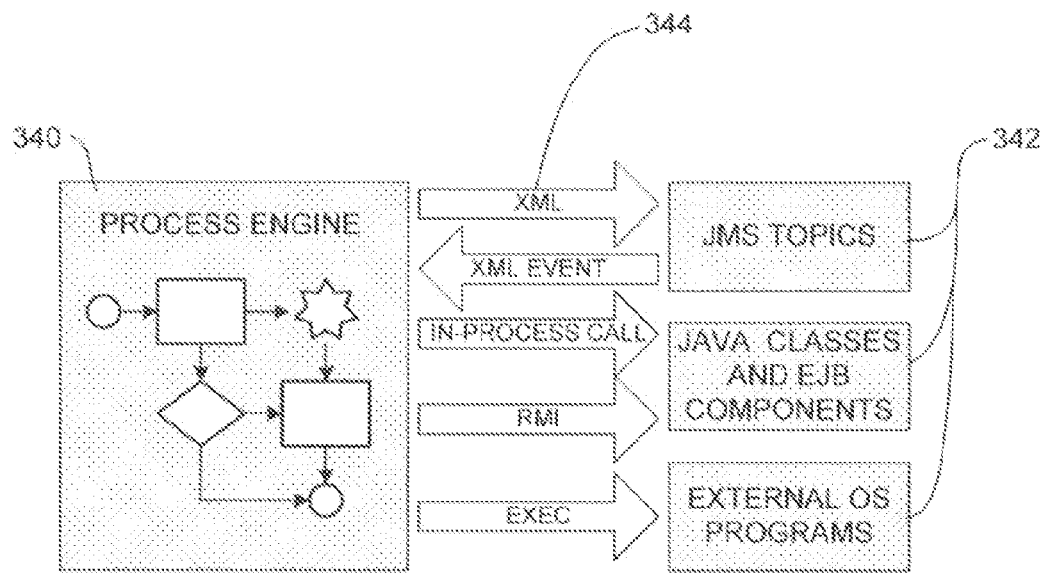
FIG. 17 is an illustration of a workflow and client interaction in accordance with an embodiment of the invention.
Figure 18:
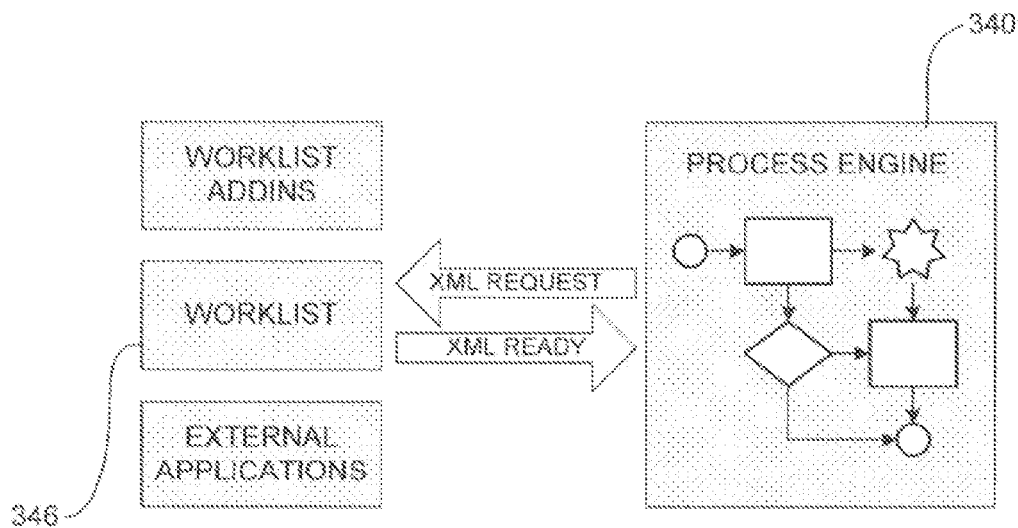
FIG. 18 is an illustration of a workflow and enterprise application interaction in accordance with an embodiment of the invention.

The workflow server process engine 340 may thus communicate directly with a worklist client, shown in FIG. 17. This may be a local application working within the local workflow and accepting or sending workflow process messages directly to the workflow. The workflow server process may also communicate with enterprise components 342, using XML 344, RMI and EXEC, among others. As shown in FIG. 18 the workflow server 340 includes the ability to both send and receive XML messages 346 related to its workflow. This is how it communicates with the collaboration server, or the collaboration system as a whole. More particularly, the workflow server can pass messages to the c-enabler by XML, which then communicates these messages to the c-hub. Messages from the c-hub are then similarly passed by the c-enabler to the workflow server, again in XML format. In this manner, not only can the workflow server affect the enterprise workflow operating on the enterprise level, but the enterprise level workflow may also affect the workflow operating at the local level. This is the true measure of collaborative e-commerce.

Business Protocol and Logic Plug-ins

Evolving business models on the Internet require the flexibility to measure business performance in many different ways. Business Logic Plug-ins allow the c-space owner to add unique functionality to a c-space such as auditing, billing, or invoking complex business rules. For example, the c-space owner may have a business model that requires them to bill or audit based on the content, volume, number of recipients, etc. of messages, which have been mediated by a c-space.

Additionally, while the Internet has provided companies with the ability to do business with nearly anyone that they want to-this might not always be desired. Using the Business Logic Plugins and complex business rules, filtering functionality can be used to enable individual trading partners to decide whether or not they want to receive a particular message (or perhaps any message) from a particular trading partner. For example, a trading partner may not want to receive a "request for proposal" message for fewer than 5,000 units. In this case, a filter would be used to reject any request for 4,999 or fewer units. Conversely, routing functionality can be used by a c-space owner to add to or delete trading partners from the recipient list for a particular message. This could be used to tailor the list to a relevant, desired set of recipients—or expand it in order to increase the chance of finding an appropriate "buyer" or "seller".

Logic Plug-ins

Logic Plug-ins is the term used to describe the individual components or modules in the chains shown in the preceding c-hub architectural overview. Each chain, as a whole, has an obligation to satisfy its respective contract, described earlier. However, as long as the contract is satisfied, the other modules in the chain are free to do additional processing.

Logic Plug-ins can be "chained" so that, after one Logic Plug-in is finished running, the next sequential Logic Plug-In of this type will normally be activated. Each successive Logic Plug-In will be able to access the changes, if any, to modified message information.

The following list illustrates the types of additional processing (sometimes referred to as rules) that can be performed by modules in a chain:

Route modification

Content modification

Examination

The ability to "Reroute on Error"

Publish-Side and Receive-Side filters (described in further detail below) are special route modification Logic Plug-ins placed in the Router and Filter chains, respectively. Either the c-hub owner or the trading partner or both can specify these filters. The Publish-Side filter is used by the sending trading partner or the c-hub owner to specify a list of target trading partner recipients for the message being sent. This filter, a router Logic Plug-In, may add to, remove from, or not change the current list of recipients. This list of recipients is still subject to validation by the c-hub Router. The Receive-Side filter is used by the receiving trading partner or the c-hub owner to determine whether or not the message should be sent to the specified recipient. It must provide a "yes" or "no" decision as to whether to send the document to the specified trading partner recipient.

Business Protocol Plug-ins

Someone who writes a business protocol plug-in needs to implement the full suite of Decoder, Router, Filter, and Encoder Logic Plug-ins in the c-hub. This is required in order to provide the message processing capabilities necessary to pass a message from a sender, through the c-hub, to zero or more recipients. In addition, a conversation manager is required to handle the basic message processing capabilities needed to route a message. A business protocol plug-in developer should provide:

1. Protocol and Plug-In implementations: This will handle message-specific processing needs, such as finding the trading partner information in the message.

2. A conversation manager implementation: This will handle conversation needs, such as finding out whether there are any recipients available for the given message.

3. Repository information: The c-hub repository will need to have information that allows the protocol plug-in to provide the necessary support, including such things as conversation names, DTDs, business identifiers, and so on.

Repository

Figure 19:
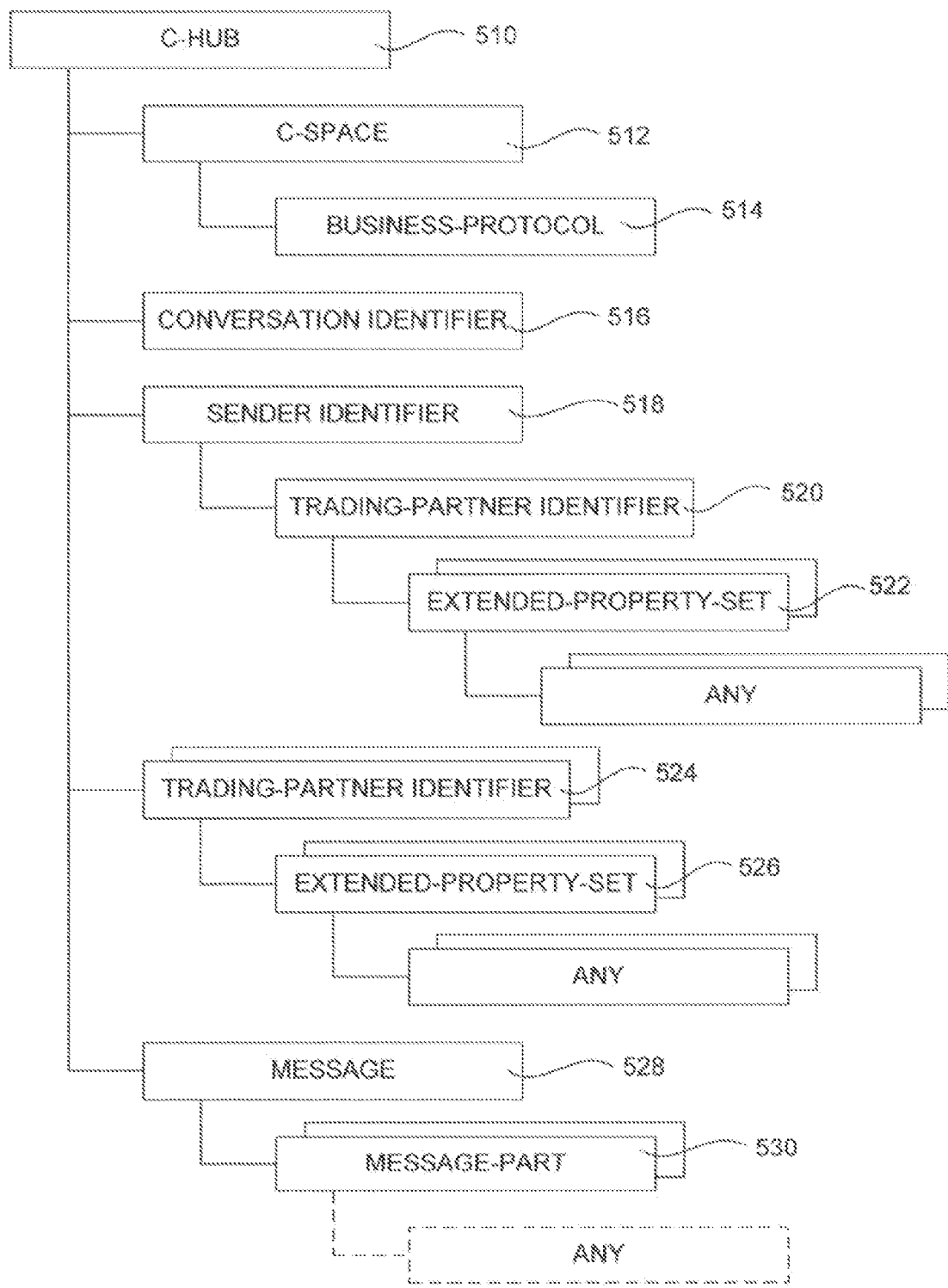
FIG. 19 is a schematic of a c-hub repository in accordance with an embodiment of the invention.

The c-hub stores all the information it needs to manage a c-space in a c-hub repository. FIG. 19 represents the c-hub repository needs as a hybrid based on a block layout that is repository-oriented. This indicates the type of information required to configure the c-hub in order to provide support for multiple protocols within a c-space, URLs for protocols, and Logic Plug-Ins. This information may include the c-hub 510, the c-space 512, the business protocol used 514, the conversation identifier 516, the sender identifier 518, the trading partner identifiers 520, 524, together with any extended property sets 522, 526, the message identifier 528, and in some instances a portion of the message itself 530.

The fields used in one embodiment of the invention include the following:

//c-hub/cspace/business-protocol:
Each c-space supports one or more identified business protocols. The name is a logical name for a protocol defined in the Business Protocol Def.
//c-hub/cspace/business-protocol@url:
Each business protocol must specify a URL to be used to connect to the decoder for that c-space.
//c-hub/business-protocol-def:
The definition of a business protocol that is used in one or more c-spaces. //c-hub/business-protocol-def/decoder:
This specifies the chain of decoders to be used when processing a message. These are logical names for Logic Plug-Ins defined elsewhere. At least one of these is responsible for fulfilling the responsibility for this type of Logic Plug-In and this business protocol. The Logic Plug-Ins in the chain will be processed in the specified sequence.
//c-hub/business-protocol-def/router:
This specifies the router chain, which is analogous to the decoder chain described previously.
//c-hub/business-protocol-def/filter:
This specifies the filter chain, which is analogous to the decoder chain described previously.
//c-hub/business-protocol-def/encoder:
This specifies the encoder chain, which is analogous to the decoder chain described previously.
//c-hub/business-protocol-def/java-class:
The Java class specifying the implementation of this particular protocol. //c-hub/business-protocol-def/init-params:
When the business protocol is loaded and initialized, its init( . . . ) method will be invoked with a hash table of the name-value pairs specified in the following elements.
//c-hub/business-protocol-def/init-params/name:
The "name" part of a name-value initialization pair.
//c-hub/business-protocol-def/init-params/value:
The "value" part of a name-value initialization pair.
//c-hub/user-exit-def:
This provides a concrete definition for a Logic Plug-In specified by a logical name.
//c-hub/user-exit-def/document:
Zero or more DTDs used by the Logic Plug-In. These are the logical names for DTDs defined elsewhere in the Collaboration Server repository as Documents. The main decoder Logic Plug-In will frequently require one or more DTDs for non-XOCP protocols.
//c-hub/user-exit-def/java-class:
The Java class specifying the implementation of this particular Logic Plug-In.
//c-hub/user-exit-def/init-params:
When the Logic Plug-In is loaded and initialized, its init( . . . ) method will be invoked with a hash table of the name-value pairs specified in the following elements.
//c-hub/user-exit-def/init-params/name:
The "name" part of a name-value pair.
//c-hub/user-exit-def/init-params/value:
The "value" part of a name-value pair.
//c-hub/trading-partner-protocol:
Additional trading partner information needed for non-XOCP business protocol support.
//c-hub/trading-partner-protocol /external-url:
An external URL to where messages should be routed (business message and replies).
//c-hub/trading-partner-protocol /business-identifier:
A business identifier to be used by an external trading partner, distinct from the internal The Collaboration Server trading partner name.
//c-hub/trading-partner-protocol /business-identifier/type:
The type of the business identifier. For example, for RosettaNet, a "DUNS" number is used. The type names are under control of the c-hub administrator and need to be synchronized with the related business protocol plug-in.
//c-hub/trading-partner-protocol /business-identifier/value:
The value of the business identifier, correlated with the business type described earlier. For example, a "DUNS" identifier is a 9-digit number.

Deploying the Collaboration System

Figure 20:
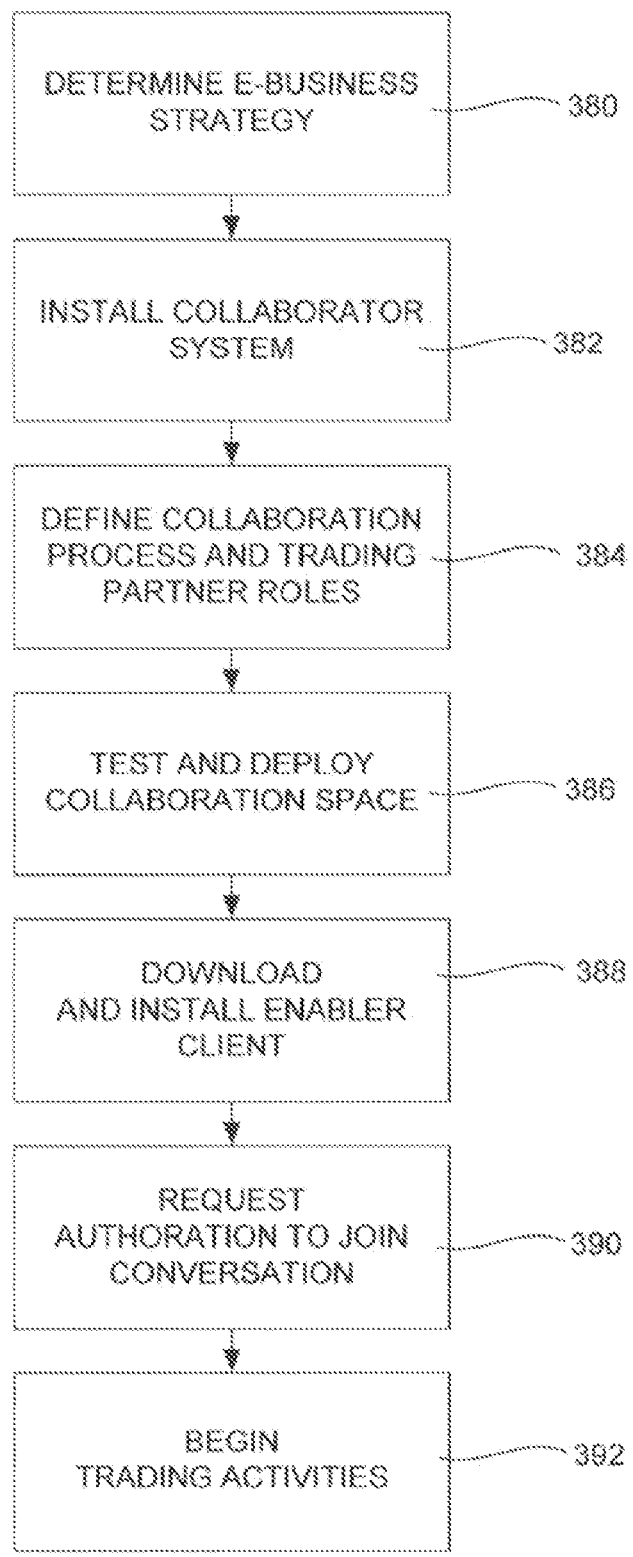
FIG. 20 is a flowchart of an enterprise-wide collaboration system deployment process.

The invention provides a comprehensive infrastructure that meets the rigorous technology standards for B2B e-commerce, but keeps the barrier to B2B low for you and your business partners. The following section outlines how a company can rapidly create a c-space and transform traditional trading partners into co-collaborators, using the invention. FIG. 20 summarizes the steps required.

1. E-Business Strategy 380: First, based on an e-business strategy, a company must determine the types of business transactions to be conducted and the number of participants or trading partners necessary to achieve critical mass for a c-space. At this point, as owner of the c-space they (the company) identify the trading partners desired for the collaboration, and select the business and information protocols that will be supported.

2. Install the collaboration system 382: The company can then install and configure the c-space hub, and establish one or more XML protocols that will be used to facilitate conversations between the trading partners. For instance, they might choose a custom vocabulary and/or an emerging industry standard, such as RosettaNet.

3. Define the Collaboration Process and Trading Partner Roles 384: Next, the c-space owner defines the collaboration process, or the means in which transactions will be conducted. Outlining "collaborations" involves, in essence, defining the inter- and sometimes intra-company process flows and transaction behavior that will take place within the c-space. Once this is defined, the trading partner roles for that particular conversation ("buyer" or "seller") are established. The business process models for each role may then created using the graphical design tools provided by the invention. Once the roles have been established, the types of messages that each trading partner can receive can be configured.

4. Test and Deploy the C-space 386: If all components are implemented successfully, the c-space is established and goes live.
5. Downloading the C-enabler 388: Once the business-level relationships are established with trading partners (negotiated in parallel to steps 1–4), trading partners are able to download lightweight c-enabler software, begin the configuration process, and work to understand the processes of a particular c-space. As a part of the configuration, the trading partner must install an X.509 certificate provided by an independent Certification Authority.
6. Request Authorization 390: Once a c-enabler is operational, the trading partner requests and is granted access to particular conversations. At this point, the trading partner may obtain, from the c-space owner, the process model for their respective role in the c-space's global business process. Execution of local process models can also be provided by workflow products such as BEA WebLogic Process Integrator. Each trading partner has the option to configure the local aspects of how BEA WebLogic Process Integrator operates, which may include the execution of actions, routing exceptions to humans or integrating to other enterprise systems.
7. Begin Trading Activities 392: Once local business rules, processes, and actions have been identified and implemented locally at the trading partner's site, the trading partner is ready to begin trading in the c-space and to receive messages relevant to their role in the various processes. The invention provides the c-space owner with the capabilities to add or remove trading partners and re-configure conversation parameters on-the-fly without disrupting the system.

Security and Administration

The privacy, security, and verification-of-receipt capabilities of B2B technologies must enable users to maintain proprietary business practices, meet ongoing business demands and maintain an advantage over their competitors. To support these requirements the c-hub can be configured to support a comprehensive set of Internet security features, including:

Privacy: SSL support for ensuring privacy of data over the Internet.

Authentication: Mutual authentication, where trading partners and the c-hub authenticate each other before allowing participation in dynamic collaboration activities. Authentication is based on X.509 certificates obtained from a trusted, third-party Certificate Authority.

Authorization: Access Control Lists and a role-based conversation participation mechanism to ensure authorized access to e-business collaborations and the corresponding messages that exist within in a c-space. Trading partners are authorized for specific roles within a c-space which, along with filtering features, govern the types of messages they can publish and receive.

Nonrepudiation: In some cases, business rules require that a receiver of a business document or message has legally sufficient and persistent proof about the receipt, the content, and the sender of the document—similar to that of a registered letter or notary public in the off-line world. The invention the required infrastructure support for digital signatures, digital receipts, and secure auditing.

Embodiments of the invention also include an administration console, that which allows the c-space owner or designated administrator to configure and manage services and c-spaces using a Web browser. Common administrative functions include managing trading partners (adding or removing trading partners, granting and revoking access to conversations, etc.), configuring messaging services, monitoring on-going conversations, browsing system status (interactions, message delivery, and logs), and generating activity reports.

The administration console offers dynamic management capabilities, which enable the re-configuration of system services on-the-fly, and the addition of new trading partners without disrupting the system. In addition to the Web-based user interface, system management functions are available via administration messages—this allows for automated monitoring and error recovery, and for integration to third-party system management tools.

XPATH Filtering

The c-hub routes business protocol messages that are sent between trading partners. The c-hub supports different business protocols, which can be generally classified as XOCP protocols or external protocols:

XML Open Collaboration Protocol (XOCP) is one of the default protocol used by the invention. This protocol is sent and received by trading partners using the c-enabler API. It provides support for conversation life cycle tracking and the management of business interactions by a mediating c-hub.

External protocols are business protocols that may be sent by other products and conform to other conventions or standards (such as a RosettaNet message from a Vitoria trading partner). The c-hub determines the business protocol to be processed based on the URL that is specified when a connection is initiated from a trading partner to the c-hub transport layer.

In the XOCP protocol the routing criteria are specified in a separate header of the message protocol. The sender can specify an XPATH router as a component of the message. This XPATH router is a string expression that specifies the intended recipients of the message in a very flexible manner using the XPATH syntax. The c-hub evaluates this XPATH expression after it receives an XOCP message from the sender. Thus, the XOCP protocol enables dynamic routing of the message to target recipients.

The c-hub maintains contextual information about interactions between trading partners (also known as conversation coordination). The XOCP protocol carries the information that enables the c-hub to monitor and maintain the status of the conversation and its participants. Before the c-hub retransmits an XOCP message to a set of target trading partners, it evaluates the XPATH expression against the set of trading partners configured in the repository to determine the routing of the message.

The routing functions of the c-hub may be extended to support additional XPATH expressions defined in the repository, as well as user-defined extended properties that can be referenced to control the routing of messages.

XPATH expressions for routing messages to trading partners is a special feature of the XOCP business protocol. When an application publishes a message using an external protocol (such as RosettaNet), the target recipient is explicitly encoded by the sender in the content of the message. Unlike the XOCP protocol, there is no concept of a mediating c-hub that can dynamically route the message to target recipients—both the sender and the target are completely specified by the external protocol.

Figure 21:
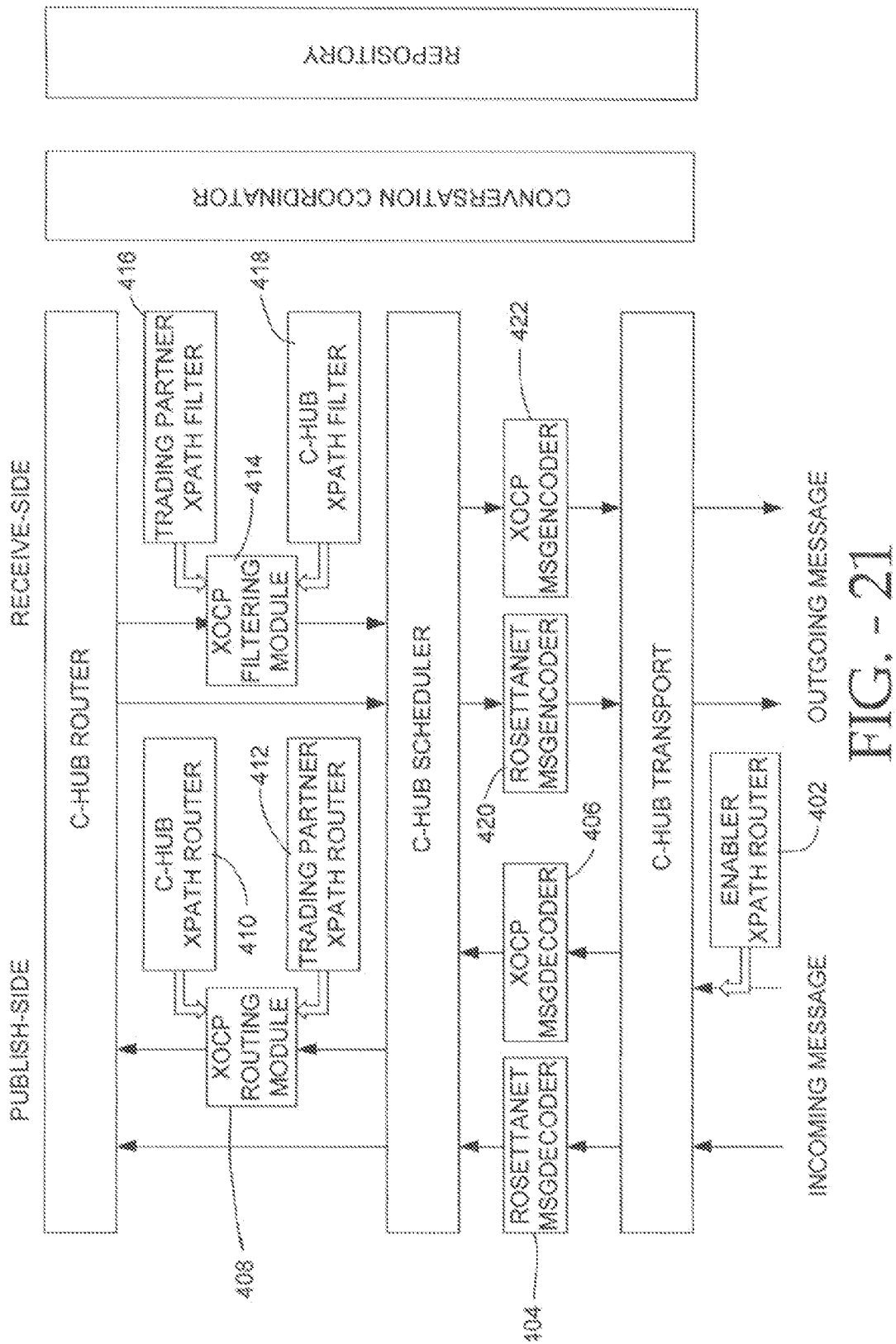
FIG. 21 is a schematic of a c-hub in accordance with an embodiment of the invention, showing the XOCP routing and filtering mechanisms.

FIG. 21 illustrates a high level overview of message processing and routing in the collaboration server c-hub. This section primarily addresses the XPATH routing and filtering aspects of the c-hub processing.

The repository provides a pre-defined set of entity definitions (and associated properties) that support conversations between trading partners in a collaboration system using the invention. However, applications need to be able to extend these definitions so that application-specific information can be modeled and stored in the repository.

More specifically, the trading partner information in the repository is extended to support application-defined properties that can be associated with a trading partner. C-hub routing and filtering features can make use of these properties. These extended properties are organized by uniquely named extended-property-sets using the c-hub administration console and associated with one or more trading partners.

The extended property sets are modeled in the repository so that they can be retrieved as subtrees within an XML document. These XML subtrees appear in the generated message-context XML document sent to the XPATH routers and filters. The XPATH expressions for the routers and filters can reference these extended properties. The root elements of each extended property set associated with a given trading partner will be inserted as the last children of the <trading-partner> element node.

XPATH Routers

C-enabler XPATH routers 402—These are XPATH routers that are sent by an c-enabler application when publishing a message. The Conversation.publish( ) method allows a c-enabler application to specify an XPATH router expression when sending a message. This router contains an XPATH expression that selects a subset of <trading-partner> nodes from the message-context XML document generated by the repository. These XPATH router expressions can be extended so that c-enabler applications can select a set of trading partners by including references to application-specific extended properties.

Trading partner XPATH routers 412—These are routers that are specified by a c-hub administrator in the repository and associated with a sending trading partner. These routers are similar to the c-enabler XPATH routers that are sent with a message, in that they use XPATH expressions to select a subset of target<trading-partner> nodes. For every message sent by a trading partner using an XOCP conversation, the associated XPATH routers for that trading partner are evaluated against a message-context XML document generated by the c-hub for that message. The generated message-context XML document contains information about the sending trading partner, the conversation context, the message context, and a sequence of subtrees containing the XML parts of the business document.

C-hub XPATH routers 410—These are routers that are specified by a c-hub administrator in the repository and associated with all incoming messages in an XOCP protocol stack. These routers are similar to the trading partner XPATH routers that are sent with a message, but they are evaluated after any c-enabler or trading partner XPATH routers.

A c-hub administrator can specify multiple XPATH routers for the c-hub and for each trading partner using the c-hub administration console. These XPATH routers are stored in the repository. The c-hub administrator specifies the XPATH expression for each router, whether the router should reference the content in the application message parts, and the order in which the XPATH routers should be evaluated for each trading partner and for the c-hub.

The message-context XML document that the XPATH expression is evaluated against can be generated with or without expanding the child nodes of the <message-part> element. For large application messages expanding the <message-part> could have a significant performance impact. If an XPATH expression does not reference the content of a message-part then the administrator can specify that the router does not need the message-part to be included.

Each XPATH router expression in the ordered sequence can be configured to replace previous routers (that is, it overrides any routing done by a previous router in the sequence), or it can be configured to append a subset of trading partners to the previous router results. The c-hub XPATH routers are evaluated after all of the sending trading partner XPATH routers.

XPATH Filters

Trading partner XPATH filters 416—These are filters that are defined by an administrator and associated with a trading partner. Using the c-hub administration console, the administrator defines a filter with an XPATH expression and associates it with a trading partner. When the c-hub routes a message to a trading partner with the XOCP protocol, the XPATH filter is used to examine the message context and determine whether to send the message to the trading partner or not. The XPATH expression is evaluated against a message-context XML document generated by the XOCP filter module. It contains information extracted from the message context and the repository. If the c-hub evaluation of the XPATH expression returns false, then the c-hub does not route the message to the target trading partner. Otherwise, the c-hub processes the message as usual.

C-hub XPATH filters 418—These are filters that are defined by an administrator and are associated globally with the c-hub for all XOCP messages. Using the c-hub administration console, an administrator defines these filters with an XPATH expression. When the c-hub routes a message to a trading partner in an XOCP protocol c-space, the XPATH filter is used to examine the message context and determine whether to send the message to the trading partner or not. The XPATH expression is evaluated against a message-context XML document generated by the XOCP filter module. It contains information extracted from the message context and the repository. If the c-hub evaluation of the XPATH expression returns false, then the c-hub does not route the message to the target trading partner. Otherwise, the c-hub processes the message as usual.

An administrator can specify multiple XPATH filters for each trading partner and for the c-hub. The c-hub administrator uses the c-hub administration console to specify the order in which the filters should be evaluated for each trading partner and for the c-hub. The filters for the c-hub are evaluated after the filters for a target trading partner. Each filter has an XPATH expression and an indication as to whether to expand the <message-part> element of the message-context XML document.

Each XPATH expression in the configured sequence must evaluate to a Boolean true or false result. If the c-hub evaluation of an XPATH expression evaluates to false, then the c-hub does not send the message to the target trading partner and no further filtering is performed. Otherwise, the c-hub continues to process the XPATH filters until either a subsequent filter in the sequence returns false, or until all filters return true.

The message-context XML document generated for a c-hub or trading partner XPATH filter is almost identical to the document generated for an XPATH router. The only differences are that the context attribute on the root element is identified as "hub-filter" or "trading-partner-filter", and the set of target<trading-partner> nodes is always just a single occurrence.

Bridges, Gateways and Proxies

Since the invention is designed to be as flexible as possible in facilitating enterprise-wide e-commerce collaboration, the collaboration system may support a number of complex scenarios that extend the reach of the collaborative workflow beyond that described earlier. These scenarios include the use of bridges, gateways, and proxies.

Figure 22:
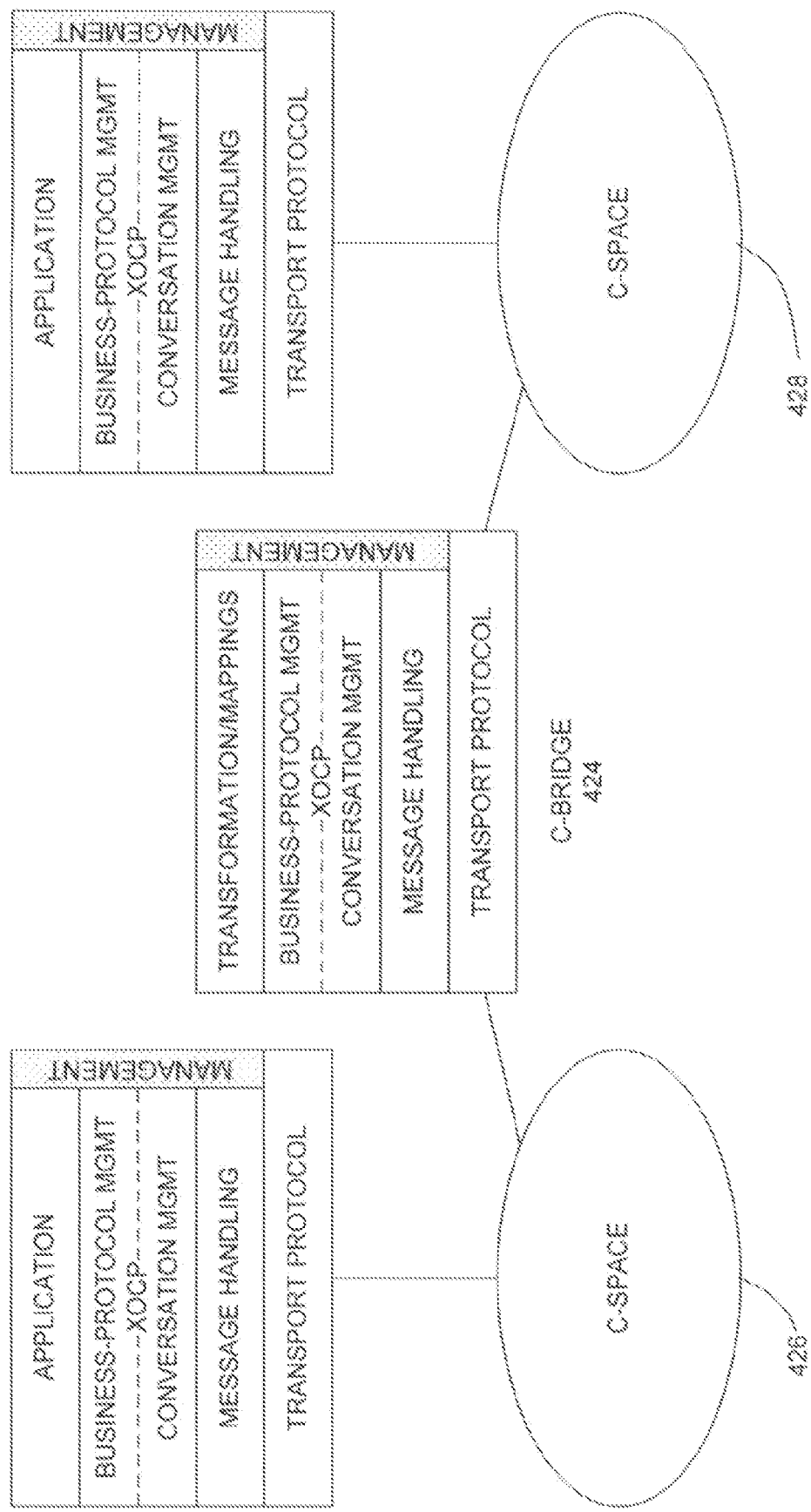
FIG. 22 is a schematic of an XOCP c-bridge in accordance with an embodiment of the invention.

FIG. 22 shows an example of a bridge (c-bridge). The c-bridge 424 is used to connect two separate c-spaces 426, 428, and to provide workflow communication between them. Any trading partner may act as a c-bridge, which may be configured to subscribe to messages from one c-space, transform them to the vocabulary of a second c-space, and then publish the transformed message into the second c-space. This capability provides a simple way of combining business models on the Web.

Figure 23:
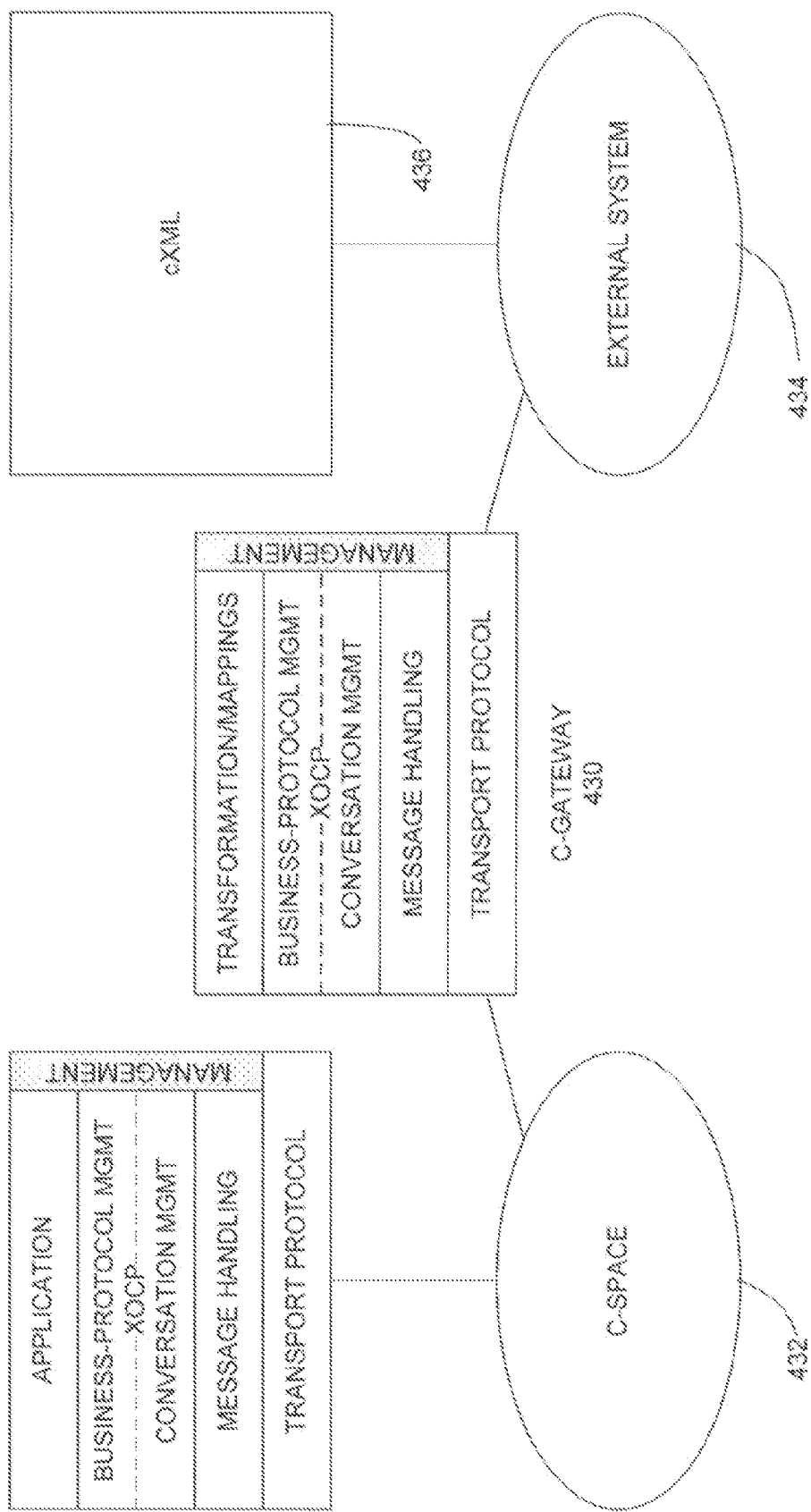
FIG. 23 is a schematic of an XOCP c-gateway in accordance with an embodiment of the invention.

FIG. 23 illustrates a c-gateway. The c-gateway 430 can be used to publish messages from a c-space 432 to external system 434, such as Ariba Net. Other c-gateways can be used for other systems, including any that use XML as a message receiving and sending protocol.

Figure 24:
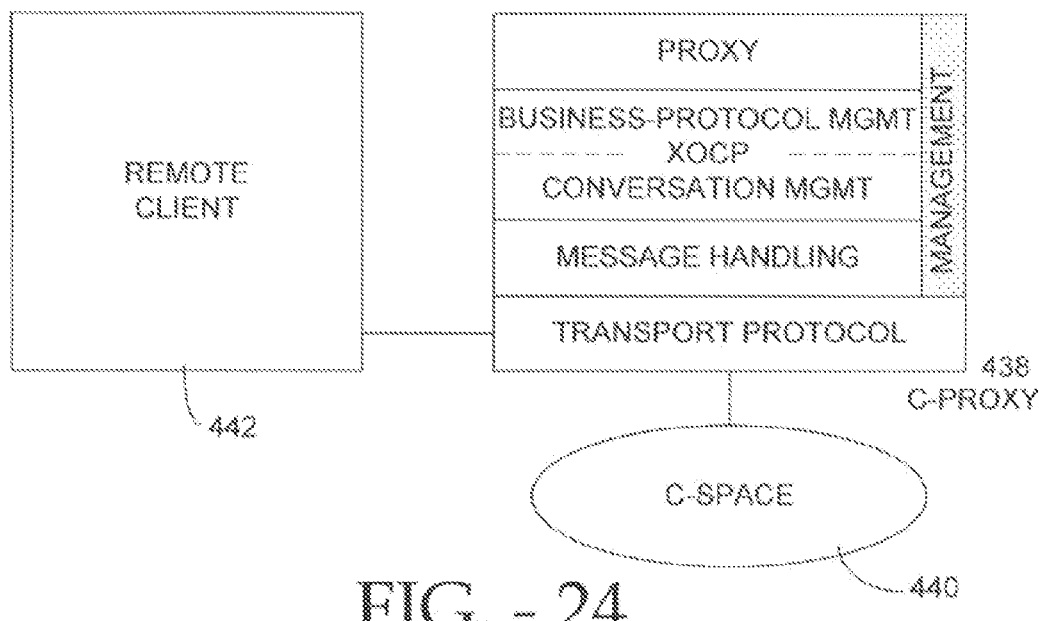
FIG. 24 is a schematic of an XOCP c-proxy in accordance with an embodiment of the invention.

FIG. 24 illustrates a c-proxy. C-proxies 438 may be used to send and receive messages from a c-space 440 to a remote client 442, such as an email system, XSL display device, or a wireless (WAP) device.

RosettaNet Protocol Router

A RosettaNet router, using the business protocol plug-in mechanism, allows RosettaNet messages to be routed by the Collaboration Server hub between any two participating RosettaNet clients. The clients supported include "native RosettaNet" clients like Vitoria and webMethods.

An example of a RosettaNet router is shown in FIG. 21. The "RosettaNet router" should not be confused with the previous use of "router". By itself, "router" refers to a Logic Plug-In in a particular chain in the c-hub. "RosettaNet router" refers to the entire RosettaNet protocol set of Logic Plug-ins, solely oriented toward sending messages from one RosettaNet client to another ("routing").

The RosettaNet router supports the Vitoria and webMethods implementations of external RosettaNet clients. In order to perform proper routing, the RosettaNet router needs information from the Preamble and Service Header XML components of the RosettaNet object in order to conform to the RosettaNet specifications. This is explained later in the Message Processing section. The out-of-the-box RosettaNet router is intended to comply with the published RosettaNet standard (as detailed in the RosettaNet specification at www.rosettanet.org, herein incorporated by reference) and is not biased towards any one vendor.

When an RNO (RosettaNet message) is received by The Collaboration Server and sent to the decoder portion 404 of the business protocol for processing the message the following happens:

The RNO format is not changed:

The digital signature is not validated. Validation of the digital signature is expected to be done by the receiving trading partner.

Read-only access is required to the document in order to retrieve the information needed for routing purposes. The generic c-hub RosettaNet router does not modify the document. However, customer-provided Logic Plug-ins or business protocol plug-ins might do so.

All of the XML components are processed: the Preamble, the Service Header, and the Service Content.

Because of the above processing, the following information must be valid for the routing to proceed:

RosettaNet Implementation Framework (RNIF) version

RNO content length

MIME multipart structure, including:

Content-Type

Boundaries

Valid XML for the Preamble

Valid XML for the Service Header

Well-formed XML for the Service Content

RosettaNet Object Routing and Conversation Information

Routing and conversation information is constructed from parsing the RNO's XML parts. The c-space is determined based on the URL used to access the c-hub. The remaining RNO fields must be valid in form and in how they are used:

//Preamble/VersionIdentifier: The RNIF version number.

The only RNIF version that The Collaboration Server will support is "1.1".

//ServiceHeader/ProcessControl/ProcessIdentity/GlobalProcess

IndicatorCode: The PIP identifier.

This typically has a value like "3A4" and it is used as the conversation name. It must be entered as such in the repository.

//ServiceHeader/ProcessControl/ProcessIdentity/VersionIdentifier:

The version of the PIP specification used. This typically has a value like "1.1" and should not to be confused with the RNIF version number. It is used as the version number of this conversation. It must be entered as such in the repository.

//ServiceHeader/ProcessControl/TransactionControl/PartnerRoleRoute/fromRole/PartnerRoleDescription/GlobalPartnerRoleClassificationCode:

The "from role" or the role of the sender. This typically has a value like "Buyer" and it is used as the role of the sender in the conversation. It must be entered as such in the repository.

//ServiceHeader/ProcessControl/TransactionControl/PartnerRoleRoute/toRole/PartnerRoleDescription/GlobalPartnerRoleClassificationcode:

The "to role" or the role of the recipient. This typically has a value like "Seller" and it is used as the role of the recipient in the conversation. It must be entered as such in the repository.

//ServiceHeader/ProcessControl/TransactionControl/[ActionControlSignalControl]/PartnerRoute/fromPartner/PartnerDescription/BusinessDescription/GlobalBusinessIdentifier:

The business identifier of the sender of this message. For the unique business identifier, RosettaNet specifies use of the 9-digit DUNS number. It must be entered as such in the repository. The business identifier is used to identify the sending trading partner in the conversation.

//ServiceHeader/ProcessControl/TransactionControl/[ActionControllsignalcontrol]/PartnerRoute/topartner/PartnerDescription/BusinessDescription/GlobalBusinessIdentifier:

The business identifier of the recipient of this message. It is similar to the "fromPartner" business identifier. The business identifier identifies the recipient trading partner in the conversation.

//ServiceHeader/ProcessControl/ProcessIdentity/ InstanceIdentifier:

A supposedly unique alphanumeric identifier for this business process, though RosettaNet also states that the initiating partner's business identifier (DUNS number) should be used. These two numbers are combined to form the conversation id, but are only used for monitoring and auditing purposes, not for routing purposes.

//ServiceHeader/ProcessControl/ProcessIdentity/initiating-partner/GlobalBusinessIdentifier:

The initiating partner's business identifier (DUNS number). As stated earlier, this is used to construct the conversation id.

//ServiceContent/thisDocumentIdentifier/ProprietaryDocumentIdentifier:

The document identifier. This is the initiator.

//ServiceContent/thisMessageIdentifier/ProprietaryMessageIdentifier:

This document identifier. This is a follow-on document in the same dialog.

//ServiceContent/receivedDocumentIdentifier/Proprietary-Document Identifier:

The initiating document identifier.

When decoding the RosettaNet message, an additional check can be made that the DUNS identifier of the sender, as retrieved from the message, matches that of the certificate. Since the c-hub is acting as a trusted intermediary, this will validate that the sender is who is claimed before the message is passed on to the recipient. If the match fails, the message will be rejected by the c-hub.

The collaboration server processing layers and business protocols neither generate nor validate any digital signature associated with the message because this is an issue among the various trading partner clients, whereas the c-hub is simply relaying messages. The c-hub only validates based on the SSL certificate.

If a particular business protocol is passing messages that have a digital signature, then the operations that a Logic Plug-In can perform on those message will generally be restricted to read-only unless the Logic Plug-In is allowed to re-sign messages on behalf of the original sender (or has access to the original sender's certificate/private key). However, nothing prevents a hub-provider from introducing Logic Plug-Ins that can validate or generate digital signatures.

Replying to the RosettaNet Sender

RosettaNet is a point-to-point protocol, and not prepared to interact with an intermediate hub. There are two main ways to approach the hub issue with RosettaNet—Synchronous and Asynchronous Message Transfer.

Synchronous Message Transfer

In this approach, the sender delivers a message to the c-hub, and the message passes all the way through the c-hub to the recipient, who returns the HTTP status code. The transport layer then returns that status to the layer initiating the outbound request, which passes it back through the various c-hub layers and eventually to the sender.

Asynchronous Message Transfer

This approach can also be referred to as a "delegated responsibility" model. The c-hub already needs to do about the same level of initial validation that the recipient would need to do. Enough of the lengths and first two XML components need to be checked that the message should make it to the upper protocol-processing layer of the recipient. In this case, it should be acceptable for the c-hub to send back the OK/BAD response after its initial processing. All responses may be logged.

An advantage to this approach is that the message persistence capabilities of the c-hub allow delivery to a recipient that is temporarily unavailable. Many of the problems that may be encountered by the RosettaNet recipient would already have been caught and reported by the c-hub. If the RosettaNet client starts processing the message and encounters errors at the business rule level (message content), a separate out-of-band error reporting mechanism is already provided by RosettaNet, and this can be routed through the c-hub like any other RosettaNet message.

If the c-hub thinks a message is not valid that the recipient might accept, then the hub-provider will have to determine which party is non-compliant, the sender, the c-hub, or the recipient, and take appropriate action. For example, if it was the c-hub, the RosettaNet router could be modified for different behavior (presumably being less strict in compliance checking).

If the recipient rejects a message that the c-hub accepted, again the hub-provider will probably have to get involved to determine the non-compliant party. However, the recipient would generally respond to the c-hub with a BAD REQUEST message, which the c-hub can log and pass back a RosetttaNet "General Exception" RosettaNet PIP to the initiator with the information.

XML Processing

The RosettaNet router needs important pieces of information from the Preamble and Service Header. This will be parsed with a validating XML parser. An error here will be logged and returned to the sender as a rejected message.

To properly function, the RosettaNet router does not need to fully parse and validate the Service Content portion. The Service Content is the business-specific portion of the message and is more appropriately handled by the receiving client. The information obtained here is for monitoring purposes. Furthermore, to validate the Service Content would require storing over 100 additional RosettaNet PIP DTDs, not including variations that might enter due to trading partner specific customization. The Service Content will be parsed as a "well-formed" document in order to retrieve the few non-essential fields required. If this part is not well-formed, however, the message will be logged and rejected by the c-hub.

For all of the XML parts, specifying an "XPath" expression for the field can retrieve the value for that field. For the Service Content part, the root node should be specified as "ServiceContent", as shown earlier. It will be replace by the appropriate message-specific root node when evaluating the XPath expression.

The Logic Plug-In mechanism does not preclude the customer from doing their own XML parsing and processing of the Service Content, however. This would allow for filtering or monitoring based on the content of the Service Content portion of the message. The customer will be responsible for the parsing, however, in order to do the filtering.

The RosettaNet router requires certain fields to be entered in the repository, typically via the administration console. The required additional information includes:

DTD to be able to parse the RosettaNet Preamble

DTD to be able to parse the RosettaNet Service Header

DUNS for the trading partners participating in RosettaNet conversations. The "Trading Partner Protocol" repository item mentioned earlier is where this information is stored, and can be entered via the administration console.

Appropriate conversation and subscription information for the trading partners. The conversation information must match the conversation information specified in the RNOs being exchanged, as described earlier.

UML Configuring of C-spaces

Extensible Markup Language (XML) is rapidly becoming a key enabler for EAI and B2B e-commerce. In most EAI and B2B scenarios, the greatest challenge is creating a dynamic free flow of information and knowledge between applications and enterprises. XML provides an open and flexible message format, or common dialect, for structuring information flow between heterogeneous systems.

XML is a metadata language, a language used to define other languages and a universal standard for structuring data. XML is intrinsically extensible and self-describing, and thus supports an extremely flexible and dynamic business environment. XML easily enables the transfer of information across the Internet and between organizations, allowing them to communicate and conduct Dynamic B2B. Dynamic B2B requires technical underpinnings that adapt to changing e-business strategies and can be extended across multiple enterprises, business partners, and diverse applications.

Figure 25:
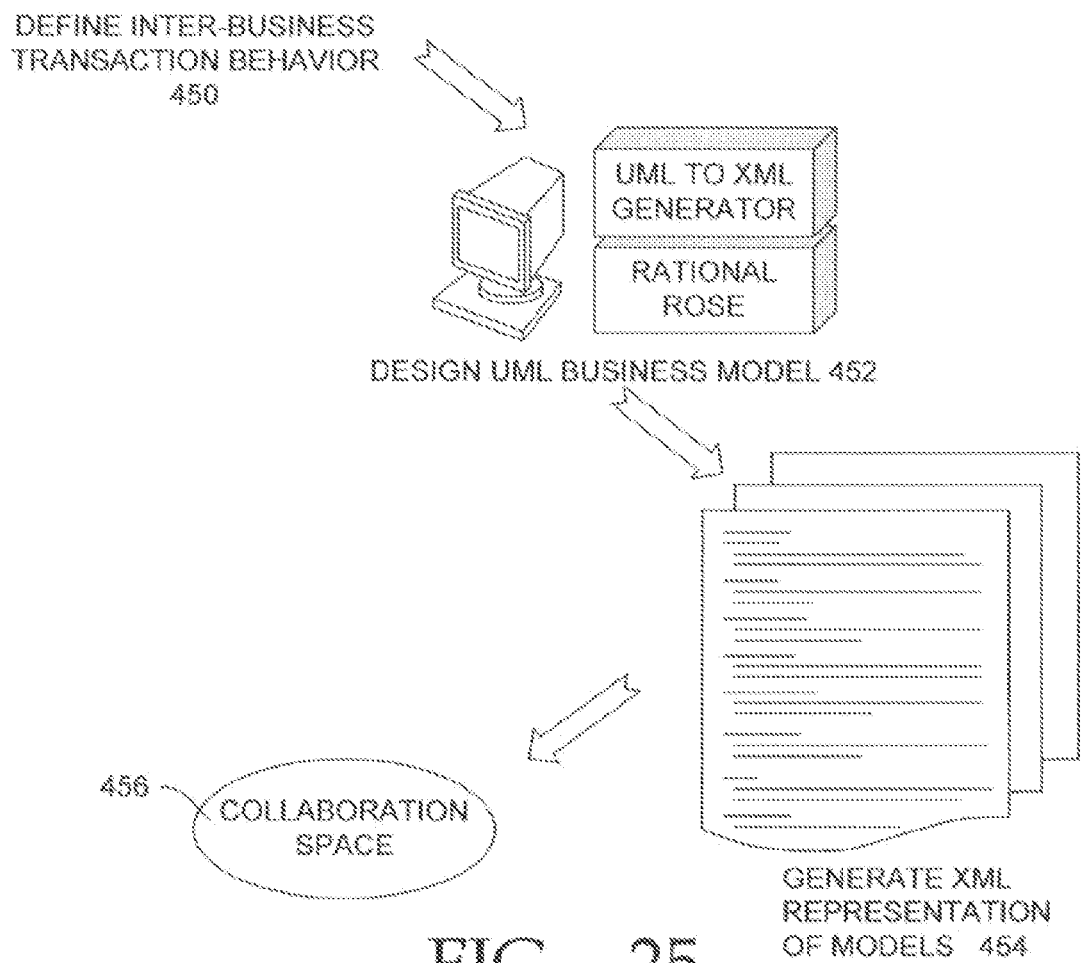
FIG. 25 is an illustration of an XML workflow creation processing using Rational Rose.

In one embodiment of the invention, using Rational Rose, a c-space can be constructed using the unified modeling language (UML). FIG. 25 illustrates the steps required in generating the XML model for use with the c-space. Activity diagrams, state charts, and class diagrams are used to define transaction models between roles, workflow state models, and a message space, respectively 450. The UML models are then used 452 to generate XML and to populate repositories with this information 454. The repositories are read at run-time by the various components of the present system to determine correct behavior 456. Since a configuration information is represented (and stored) in XML, it is possible to use off-the-shelf revision/configuration management tools to manage changes to the c-space configurations.

The Message Type System is a polymorphic hierarchy of message types. A message type is an abstraction of information that will be shared by transactors (e.g. ORDER, CUSTOMER, PRODUCT etc.). All message types share some common behavior, such as how the encapsulated information (XML) can be manipulated. Therefore the type system implements basic manipulation capabilities (create, read, update, delete) on the base level. Communication Adapter is a notion that abstracts a wire-protocol, such as HTTP, SOAP etc. When a transactor wants to communicate with somebody over a network connection, it needs to instantiate an appropriate adapter object and then pass it's reference to the message object. The content of the message object then becomes a payload of the network message and the adapter takes care of the communication protocol (headers, exceptions, timeouts etc.).

Message factories can be used to create message objects out of incoming network messages. Factories are specific to wire-protocols, not to message types. So, for example HTTPRequestFactory can handle any message that comes over HTTP. If a new message type is added, the existing factory can be leveraged. If support is added for a new wire-protocol, a corresponding factory would be implemented as well.

This embodiment implements a simple workflow engine, which is based on the idea of DFA (deterministic finite automata). The engine is driven by a XML-based flow-language. The schema (DTD) of the language looks that of Listing 2.

---

Listing 2

```
<!ELEMENT workflow  (state+ )>
<!ATTLIST workflow    type CDATA    #REQUIRED >
<!ELEMENT state    (transition+ )>
<!ATTLIST state      time_out CDATA    #IMPLIED
    state_id CDATA    #REQUIRED>
<!ELEMENT transition    (action )>
<!ATTLIST transition    rule_id         CDATA  #IMPLIED
    message_id        CDATA    #IMPLIED
    state_id          CDATA    #REQUIRED
    transition_id     CDATA    #REQUIRED
    message_type      CDATA    #IMPLIED
    timeout           CDATA    #IMPLIED >
<!ELEMENT action EMPTY>
<!ATTLIST action  rule_id    CDATA  #IMPLIED
    action_id CDATA    #REQUIRED >
```

---

The workflow model is de-centralized, so each transactor executes it's own instance of the engine. The implementation manages multiple contexts simultaneously, so a transactor can be involved in many (but separate) business transactions at the same time. XML is also used for storing the state of a workflow context. This allows this embodiment to re-load the state of a context in a different system. This design has some interesting consequences, for example the system should scale nicely in the WLS cluster environment.

The design process is started by modeling business transaction using Use Case diagram. For the example illustrated in FIG. 26 the following roles were identified: customer, dealer, and shipping company. The business transaction is "buy-a-car".

The first step is to break the Use Case into actions, and add those to an activity diagram.

The next step is to take the roles from a use case diagram, map those roles to swim lanes of an activity diagram and assign the activities to corresponding swim lanes.

The next step is to define messages that will be delivered and processed by activities.

Configuration files (publish/subscribe), message types etc., can then be generated from those diagrams. It is also possible to model each transactor's DFA by using state chart diagrams and to generate the necessary workflow definitions out of those:

Actions
Request for Information
Send Information
Place Order
Process Order
Check Inventory
Confirm
Message Types
InformationRequest
Information
Order
InventoryCheck
InventoryStatus
Confirmation
Flows
"Customer"
"Dealer"
"Shipping Company"

Figure 26:
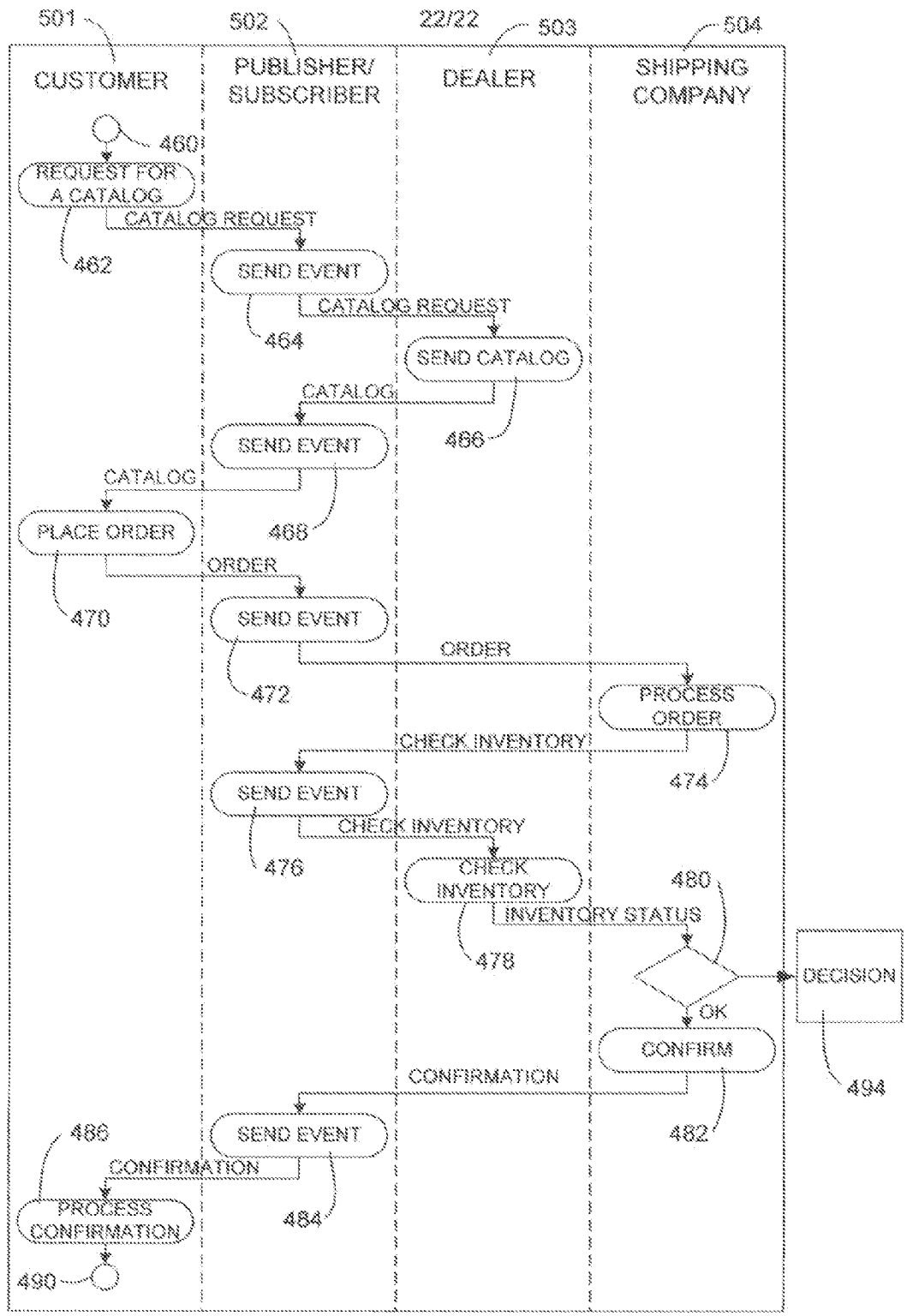
FIG. 26 is an illustration of a "swim lane" workflow example in accordance with an embodiment of the invention.

FIG. 26 illustrates an example of a workflow model as prepared using UML, and then generated in XML. The example shown in FIG. 26 describes a workflow between a customer 501, a dealer (or supplier of goods) 503, and a shipping company 504. As presented the workflow resembles a series of "swim lanes", or process flow lanes, with each entity or trading partner having their own "lane". A separate lane is reserved for the publish/subscribe entity 502 which, under control of the conversation manager, is responsible for receiving and sending messages between the various other entities.

Referring now to FIG. 26, it can be seen that the customer begins the workflow by requesting a catalog 462. The catalog request is sent as a message 464 to the publish/subscribe service. This messaging process, and all other messaging processes indicated in FIG. 26 are controlled or coordinated by the conversation manager which is responsible for the flow of messages throughout publish/subscribe "swim lane". The catalog request message is thus sent to the dealer, who responds with a send catalog message 466. Having received the catalog the customer may wish to place an order 470, and a place order message is duly issued 472. The workflow indicates this message should be sent to the shipping company rather than the dealer, and so the conversation manager/c-hub routes it accordingly 474. On receipt of the send order message the shipping company may issue a request to check the inventory 478. If the inventory check indicates the item is in stock 480 then a confirmation message 482 can be sent to the customer seeking final verification 486. Decision steps may be included in the workflow to allow for unusual or unexpected events. In the example shown in FIG. 26 a decision block 494 is included to allow for the possibility that an item may not be in stock. If this happens then the workflow may be designed to perhaps request additional information before proceeding or jumping to a different workflow path.

Industrial Applicability:

The invention helps to define an open market platform system for conducting business-to-business commerce or the Web. The collaboration system defined herein includes many novel and industrially applicable features, some of which are listed here.

Mainframe Connectivity

There are tens of thousands of IBM CICS applications hosted on the IBM MVS and VSE operating systems, and deployed on mainframes in every country around the world. Hundreds of the world's largest databases are accessed through IMS on IBM's MVS S/390 platforms. Unlike most EAI vendors, the collaboration system provides the greatest, most robust connectivity to mainframe applications. The collaboration system provides connectivity to the following: TCP, SNA and OSI TP.

Adapter Integration for Major Packaged Applications

The collaboration system products minimize programming, which greatly reduces the development effort required to connect applications. The emphasis is instead on configuration, which not only saves programming costs, but also enables developers to focus on building new e-business applications that will significantly improve their company's competitive edge.

Support for XA-Transactions

The collaboration system provides transparent support for XA-transactions. Message-based EAI products define a transactional unit of work to mean only the guaranteed delivery of a message. However, if a unit of work between integrated applications translates into multiple reads and writes, or if the integrated applications are heterogeneous, there is a strong risk of corrupt or inaccurate data, which can only be avoided by complex programming. This risk is eliminated if applications support XA-transactions and are integrated using the collaboration system because the collaboration system includes a full standards-based transaction manager capability.

E-Transaction

An E-Transaction embodiment of the invention enables businesses to jointly and successfully accelerate e-commerce strategies in real time, empowering dynamic business-to-business transactions.

The invention enables the participation by a business in the process of conducting e-commerce on the Internet with other business collaborators. This approach is significantly different from back-end business transaction systems. First, the "transactions" are of a business nature and are long running. Indeed, a business transaction may require weeks, months, or even years to complete. The state for such transactions must be kept persistently so as not to lose it during various system failure modes. Thus, a single business transaction can cause one or many back-end database transactions to occur. Traditional business-to-business e-commerce required businesses to agree on a business model for the relationship, a uniform vocabulary, and a messaging technology. With the present invention, that is no longer necessary—the platform is independent of any one business model or vocabulary and uses XML as the standard.

Zero-Latency and End-to-End Integration

The present invention provides an enterprise-class solution in the market that provides zero-latency, end-to-end integration. From the mainframe to the Web, the collaboration system provides a proven, scalable, and pre-integrated server-based environment for integrating an enterprise's packaged and proprietary enterprise applications, whether they reside on the back-office, front office, or on the Web. The collaboration system performance excels in the most demanding, distributed 24×7 environments, and offers a choice of messaging paradigms and pre-packaged application adapters and custom Adapter Development Kit to best solve the business problem at hand. The collaboration system platform migration to XML-based messaging keeps the integration solutions at the forefront of technology.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A collaboration hub for use with a collaboration system for handling messages of conversations among participants, comprising:

a transport for receiving messages from participants and sending messages to other participants using an extensible data protocol, wherein the extensible data protocol allows a participant to specify both a routing information, and a business protocol, for that conversation, wherein the routing information is specified by the participant in a header of the extensible data protocol, and wherein the business protocol is specified by a uniform resource locator used by the participant to communicate with the transport;

a decoder that decodes messages received from the participants;

a router that validates each message received from a participant at the transport, examines the routing information to determine which others of the participants the message should be delivered to, and stores the message for subsequent delivery via the transport to those participants;

a scheduler that schedules the flow of messages from the transport to the router, and from the router to the transport;

a manager that manages the flow of messages across components of collaboration hub;

a repository that stores management data, wherein said management data is used by components of the collaboration hub to handle said messages; and wherein support for an additional business protocol can be plugged into the collaboration hub, by specifying the uniform resource locator to be used with the additional business protocol, and the decoder that the additional business protocol will use to decode messages.

2. The collaboration hub of claim 1 further comprising a plurality of decoders that can be used to decode messages received from said participants, wherein each particular business protocol specifies which one or more of the plurality of decoders are to be used with that particular business protocol.

3. The collaboration hub of claim 1 further comprising an encoder that encodes messages sent to other participants, wherein the encoder is plugged between the scheduler and the transport.

4. The collaboration hub of claim 1 further comprising router logic plug-ins that determine said other participants to whom messages should be sent, wherein the router logic plug-ins are plugged between the scheduler and the router.

5. The collaboration hub of claim 1 further comprising filter logic plug-ins that determine whether to send a message to said other participants, wherein the filter logic plug-ins are plugged in between the router and the scheduler.

6. The collaboration hub of claim 1 further comprising business logic plug-ins that provide support for messages of various business protocols among the participants, wherein said business logic plug-ins are plugged in between the scheduler and the router.

7. The collaboration hub of claim 6 wherein said business logic plug-ins include a RosettaNet plug-in.

8. A method for transferring messages of conversations between participants in a collaboration system, comprising the steps of:

receiving messages via a transport from participants and sending messages to other participants using an extensible data protocol, wherein said extensible data protocol provides an ability to specify both a routing information and a business protocol for that conversation, wherein the routing information is specified by the participant in a header of the extensible data protocol, and wherein the business protocol is specified by the URL used by the participant to communicate with the transport;

decoding messages received from the participants using a decoder;

validating messages received at the transport by a router, including examining the the routing information to determine which other participant or participants the message should be delivered to;

storing messages by the router for delivery by the transport;

scheduling the flow of messages from the transport to the router and further scheduling messages from the router to the transport;

managing the flow of messages across components of collaboration hub, wherein said components comprise the transport, the router and the scheduler;

storing management data in a repository, wherein said management data is used by components of the collaboration hub to handle said; and wherein support for an additional business protocol can be plugged into the collaboration hub, by specifying the uniform resource locator to be used with the additional business protocol, and the decoder that the additional business protocol will use to decode messages.

9. The method of claim 8 further comprising the step of decoding messages received from participants using a plurality of decoders, wherein each particular business protocol specifies which one or more of the plurality of decoders are to be used with that particular business protocol.

10. The method of claim 8 further comprising the step of encoding messages sent to said other participants, wherein the encoder is plugged between the scheduler and the transport.

11. The method of claim 8 further comprising the step of determining participants to whom messages should be sent by using router logic plug-ins, wherein router logic plug-ins are plugged between the scheduler and router.

12. The method of claim 8 further comprising the step of determining whether to send a message to said other participants by using filter logic plug-ins, wherein said filter logic plug-ins are plugged in between the router and the scheduler.

13. The method of claim 8 further comprising the step of providing support for messages of various business protocols among participants by using business logic plug-ins, wherein said business logic plug-ins are plugged in between the scheduler and the router.

14. The method of claim 13 wherein said messages of various business protocols includes a RosettaNet format message.

15. A collaboration hub for use with a collaboration system for handling messages of conversations among participants, comprising:

a conversation repository that includes a plurality of collaboration spaces, wherein each collaboration space stores the messages of a conversation for delivery to and from the participants as part of that conversation;

a transport for receiving messages from participants and sending messages to other participants using an extensible data protocol, wherein the extensible data protocol allows a participant to specify both a routing information, and a business protocol, for the conversation, including specifying the routing information in a header of the extensible data protocol, and specifying the business protocol by a uniform resource locator used by the participant to communicate with the transport;

a plurality of business protocol handlers that may be plugged into the collaboration hub, each of which are configured to use a different business protocol which may be used by a participant to participate in a conversation, wherein each collaboration space and business protocol combination is subsequently identified by a unique uniform resource locator;

a plurality of decoders that translate messages between the different business protocols, wherein each decoder identifies the protocol-specific headers in the messages and then assigns the message to the appropriate business protocol handler; and a manager that manages a conversation within one of the plurality of collaboration spaces, including registering participants in the conversation by allowing a participant using a particular business protocol to access a collaboration space and the conversation therein using the unique uniform resource locator assigned to that collaboration space and protocol combination.

16. The collaboration hub of claim 15, wherein each business protocol specifies which one or more of the plurality of decoders are to be used with that particular business protocol to translate the message.

17. The collaboration hub of claim 16, wherein the business protocol specifies a chain of decoders to be used.

18. The collaboration hub of claim 15, wherein the hub supports the eXtensible Open Collaboration Protocol.

19. The collaboration hub of claim 15, wherein the hub supports the RosettaNet business protocol.

20. The collaboration hub of claim 19, wherein the hub supports variations on the RosettaNet protocol by providing a different uniform resource locator for each variation.

21. A method for managing the flow of messages between participants in a collaboration system, comprising:

providing a conversation repository that includes a plurality of collaboration spaces, wherein each collaboration space stores the messages of a conversation for delivery to and from the participants as part of that conversation;

receiving messages from participants at a transport, and sending messages to other participants, using an extensible data protocol, wherein the extensible data protocol allows a participant to specify both a routing information, and a business protocol, for the conversation, including specifying the routing information in a header of the extensible data protocol, and specifying the business protocol by a uniform resource locator used by the participant to communicate with the transport;

accessing a plurality of business protocol handlers that may be plugged into the collaboration hub, each of which are configured to use a different business protocol which may be used by a participant to participate in a conversation, wherein each collaboration space and business protocol combination is subsequently identified by a unique uniform resource locator;

accessing a plurality of decoders that translate messages between the different business protocols, wherein each decoder identifies the protocol-specific headers in the messages and then assigns the message to the appropriate business protocol handler; and managing a conversation within one of the plurality of collaboration spaces, including registering participants in the conversation by allowing a participant using a particular business protocol to access a collaboration space and the conversation therein using the unique uniform resource locator assigned to that collaboration space and protocol combination.

22. The method of claim 21, wherein each business protocol specifies which one or more of the plurality of decoders are to be used with that particular business protocol to translate the message.

23. The method of claim 22, wherein the business protocol specifies a chain of decoders to be used.

24. The method of claim 21, wherein the transport supports the eXtensible Open Collaboration Protocol.

25. The method of claim 21, wherein the transport supports the RosettaNet business protocol.

26. The method of claim 25, wherein the transport supports variations on the RosettaNet protocol by providing a different uniform resource locator for each variation.

* * * * *